US012769975B2

(12) United States Patent
Labelle et al.

(10) Patent No.: US 12,769,975 B2
(45) Date of Patent: Oct. 20, 2026

(54) RADIO FREQUENCY IDENTIFICATION (RFID) MATRIX MEMBRANE FOR RFID-BASED MOTION TRACKING SYSTEMS AND METHODS THEREOF

(71) Applicant: ELEVATE HEALTHCARE, INC., Austin, TX (US)

(72) Inventors: Sébastien Labelle, Laval (CA); Dominic Tremblay-Gagnon, Montreal (CA); Evgeny Kirshin, Montreal (CA); Éric Frenette, Laval (CA); Christopher Driscoll, Saint-Eustache (CA)

(73) Assignee: ELEVATE HEALTHCARE, INC., Sarasota, FL (US)

( * ) Notice: Subject to any disclaimer, the term of this patent is extended or adjusted under 35 U.S.C. 154(b) by 0 days.

(21) Appl. No.: 19/408,719

(22) Filed: Dec. 4, 2025

(65) Prior Publication Data

US 2026/0161919 A1 Jun. 11, 2026

Related U.S. Application Data

(60) Provisional application No. 63/727,967, filed on Dec. 4, 2024.

(51) Int. Cl.
*G06K 19/077* (2006.01)
*G06K 7/10* (2006.01)
(Continued)

(52) U.S. Cl.
CPC ... *G06K 19/07713* (2013.01); *G06K 7/10356* (2013.01); *G06K 7/10386* (2013.01);
(Continued)

(58) Field of Classification Search
CPC ............... G16H 10/65; G06K 7/10386; G06K 7/10366; G06K 7/10356; G06K 19/0723;
(Continued)

(56) References Cited

U.S. PATENT DOCUMENTS

| | | | |
|---|---|---|---|
| 6,220,866 | B1 | 4/2001 | Amend et al. |
| 7,598,865 | B2 | 10/2009 | Zhang et al. |

(Continued)

FOREIGN PATENT DOCUMENTS

| | | | |
|---|---|---|---|
| DE | 102013004843 | A1 | 9/2013 |
| WO | WO-2011140467 | A2 | 11/2011 |

(Continued)

OTHER PUBLICATIONS

Shirehjini et al., An RFID-Based Position and Orientation Measurement System for Mobile Objects in Intelligent Environments, IEEE Trans. On Instrum. Meas., pp. 1-13.

(Continued)

*Primary Examiner* — Daniel I Walsh
(74) *Attorney, Agent, or Firm* — MARSHALL, GERSTEIN & BORUN LLP

(57) ABSTRACT

Radio frequency identification (RFID)-based motion tracking systems and methods are disclosed for providing medical device feedback during simulation. A plurality of passive RFID transponders forms part of an RFID matrix membrane and are configured to be positioned proximate to at least one human body portion. A medical device simulator comprises an RFID reader for detecting respective RFID signals and X-Y coordinates from each of the plurality of passive RFID transponders. An application (app) comprising computing instructions is executed by a processor to receive RFID signal data and X-Y coordinate data from at least a portion of the plurality of passive RFID transponders and analyze
(Continued)

such data to determine a position of the medical device simulator relative to the at least one human body portion.

21 Claims, 12 Drawing Sheets

(51) Int. Cl.
*G06K 19/07* (2006.01)
*G09B 23/30* (2006.01)
*H04B 17/318* (2015.01)

(52) U.S. Cl.
CPC ......... *G06K 19/0723* (2013.01); *G09B 23/30* (2013.01); *H04B 17/318* (2015.01)

(58) Field of Classification Search
CPC . G06K 19/07713; H04B 17/318; G09B 23/30
See application file for complete search history.

(56) References Cited

U.S. PATENT DOCUMENTS

| | | | | |
|---|---|---|---|---|
| 9,704,003 | B1 | 7/2017 | Anderson et al. | |
| 12,046,151 | B2 | 7/2024 | White | |
| 2003/0174049 | A1* | 9/2003 | Beigel | G06K 19/0723 340/5.61 |
| 2008/0097731 | A1 | 4/2008 | Lanes et al. | |
| 2010/0321246 | A1 | 12/2010 | Troesken et al. | |
| 2011/0181394 | A1* | 7/2011 | Blair | A61B 90/98 340/10.1 |
| 2012/0204307 | A1* | 8/2012 | De Mattei | G09F 21/026 2/69 |
| 2013/0071826 | A1* | 3/2013 | Johnson | G09B 23/28 434/266 |
| 2013/0257595 | A1 | 10/2013 | Trösken et al. | |
| 2015/0313496 | A1* | 11/2015 | Connor | A61B 5/6814 600/301 |
| 2016/0210548 | A1 | 7/2016 | Blair | |
| 2017/0181703 | A1* | 6/2017 | Kaib | A61B 5/6805 |
| 2019/0388183 | A1* | 12/2019 | Poirier | G16H 40/20 |
| 2021/0301536 | A1* | 9/2021 | Baggs | E04D 13/006 |
| 2021/0315521 | A1* | 10/2021 | Webster | A61B 5/4836 |
| 2022/0148726 | A1* | 5/2022 | Costantino | G16H 50/30 |
| 2022/0293262 | A1* | 9/2022 | Beck | A61B 5/0205 |
| 2023/0109648 | A1* | 4/2023 | Sipe | A61N 1/046 607/5 |
| 2023/0190222 | A1 | 6/2023 | Moehring et al. | |
| 2024/0398422 | A1* | 12/2024 | Trivisani | A61B 90/98 |
| 2025/0099010 | A1* | 3/2025 | Volosin | A61B 5/349 |
| 2026/0161919 | A1* | 6/2026 | Labelle | G06K 19/07713 |

FOREIGN PATENT DOCUMENTS

| | | | |
|---|---|---|---|
| WO | WO-2022040456 | A1 | 2/2022 |
| WO | WO-2022157514 | A1 | 7/2022 |
| WO | WO-2024108416 | A1 | 5/2024 |

OTHER PUBLICATIONS

Bradley et al., "Development and Evaluation of a Wearable Simulator System", Clinical Simulation in Nursing, vol. 81, Aug. 2023.
Tahir et al., "Quadrant-Based Weighted Centroid Algorithm for Localization in Underground Mines", Lecture Notes in Computer Science, Jun. 2018.
International Search Report and Written Opinion for PCT/US2025/058041 dated Feb. 9, 2026.
Written Opinion for PCT/US2025/058041 dated Feb. 9, 2026.
International Search Report for PCT/US2025/058039 dated Feb. 12, 2026.
Written Opinion for PCT/US2025/058039 dated Feb. 12, 2026.

* cited by examiner

RADIO FREQUENCY IDENTIFICATION (RFID) MATRIX MEMBRANE FOR RFID-BASED MOTION TRACKING SYSTEMS AND METHODS THEREOF

CROSS-REFERENCE TO RELATED APPLICATIONS

This application claims priority to U.S. Provisional Patent Application No. 63/727,967, entitled "Radio Frequency Identification (RFID) Matrix Membrane for RFID-Based Motion Tracking Systems and Methods Thereof" and filed Dec. 4, 2024, the entire disclosure of which is hereby incorporated by reference herein.

FIELD OF THE DISCLOSURE

The present disclosure generally relates to a radio frequency identification (RFID) matrix membrane for RFID-based motion tracking systems and methods thereof, and more particularly to a RFID matrix membrane for RFID-based motion tracking systems and methods for providing medical device feedback during simulation.

BACKGROUND

During simulated medical procedures, medical professionals or medical students typically interact with a mannequin (e.g., a robot). For the simulation to respond to the action of the medical professional or student, a positioning detection mechanism is often necessary. An example is the use of the stethoscope for training medical students, where the stethoscope can be passed over the mannequin or robot and detected when stethoscope is at a specific location. However, such existing medical simulation technology is flawed because various areas of the mannequin or robot go undetected, thus reducing fidelity of information for the simulation. For example, use of conventional technology includes "dead zones," where conventional technology fails to provide any feedback to a medical professional or student.

Further, conventional technology is typically expensive, consumes space, can be impacted by nearby metal masses (such metal of an operating table and/or the mannequin or robot structure itself, including its wiring system), which can cause electromagnetic interference. Interference caused by the metal can render the existing technology inoperable or unsuitable for patient simulators for simulating tracking of medical instruments (e.g., stethoscope) during a simulated medical procedure or otherwise routine. Such conventional technology therefore typically requires cabling between the moving object (e.g., a stethoscope) and the reference object (e.g., robot and/or mannequin structure) to eliminate or reduce such electromagnetic interference. However, these solutions limit simulations to mannequins or robots that are hardwired, and that must be reconstructed for each different type of test.

For the foregoing reasons there is a need for a RFID matrix membrane for RFID-based motion tracking systems and methods thereof as described herein below.

SUMMARY

As described herein, a solution to overcome the issues with conventional simulation technology includes the use of an RFID matrix membrane, which is comprised of several passive RFID tags, which are referred to herein as passive RFD transponders. The passive RFID transponders can be arranged a specific layout (e.g., a matrix) to provide full area detection (i.e., full coverage) for an RFID reader and related application (RFID) that reads signal data from the matrix of passive RFD transponders. Using the RFID matrix membrane, the RFID-based motion tracking systems and methods described herein can track one or multiple medical device simulators or otherwise simulated medical equipment, such as a simulated stethoscope, and can report a respective position of a given medical device simulator.

For example, in one aspect, to simulate auscultation of the human body, the disclosed systems and methods herein describe tracking a medical device simulator (e.g., stethoscope relative to an RFID matrix membrane. Further, as described herein, by determining the position of the simulated stethoscope over the RFID matrix membrane, the systems and methods can output feedback indications, such as sound, which can be played and heard by a medical professional or medical student for training purposes.

The RFID matrix membrane and the related tracking systems and methods improve over conventional simulation technology by not requiring active or electrically wired components to be installed in a simulated mannequin or robot. Instead, This RFID matrix membrane and the related tracking systems and methods use passive RFID tags to provide position. Further, conventional technology requires cables, emitters, and receivers, all of which contribute to generating an electromagnetic field, which can cause interference. By contrast, the RFID matrix membrane and the related tracking systems and methods provide a full position tracking over or otherwise across an X-Y coordinate plane (e.g., 2D plane) while using passive components (i.e., RFID tags or otherwise RFID transponders) installed within the RFID matrix membrane, which overcome the limitations of the electromagnetic field of the conventional simulation technology. In addition, the RFID matrix membrane can be shaped or otherwise configured to fit to various human body portions (e.g., a chest area, a foot area, a hip area, a head area, or the like). In this way, the RFID matrix membrane and its related RFID-based motion tracking systems and methods provides a cost effective, scalable technology to track the position of a simulated medical equipment for training purposes.

Still further, the RFID matrix membrane is scalable because various configurations or applications can be met by adapting the pattern, shape, or otherwise coverage area of the RFID matrix membrane to a particular area of the human body, portion thereof, and/or artificial or simulated likeness thereof (e.g., a mannequin). For example, should there be a need to track position near an artificial or otherwise simulated ankle, an RFID matrix membrane can be prepared to fit over the artificial or otherwise simulated ankle, and an area of the RFID matrix membrane can be fitted with RFID transponders where a related medical device simulator is expected to move about for treating or otherwise inspecting the ankle. Creation of the RFID matrix membrane would not need require magnets, wires, cables, or other such hardware as would be the case for conventional medical training devices.

In various aspects, the disclosure herein describes an RFID matrix membrane and position detection systems having an RFID matrix membrane.

In one aspect, an RFID matrix membrane comprises a membrane configured to be positioned proximate to a human body portion and a plurality of passive RFID transponders affixed to the membrane and arranged in a matrix. Each of the plurality of passive RFID transponders is positioned such that a center of each of the plurality of passive RFID transponders is equidistant from the center of each adjacent passive RFID transponder with the membrane in a first state and is configured to provide a respective signal strength and an X-Y coordinate detectable by an RFID reader of a medical device simulator for determining a position of the medical device simulator relative to the plurality of passive RFID transponders.

In another aspect, a position detection system comprises an RFID matrix membrane and a medical device simulator. The RFID matrix membrane comprises a plurality of passive RFID transponders and a membrane configured to be positioned proximate to a human body portion and including a plurality of retention means arranged in a matrix for affixing each of the plurality of passive RFID transponders to the membrane. Each of the plurality of passive RFID transponders is affixed to the membrane via one of the plurality of retention means such that a center of each of the plurality of passive RFID transponders is equidistant from the center of each adjacent passive RFID transponder with the membrane in a first state.

In another aspect, a position detection system comprises an RFID matrix membrane and a medical device simulator. The RFID matrix membrane is configured to be positioned proximate to a human body portion and comprises a plurality of passive RFID transponders. The plurality of passive RFID transponders are arranged in a matrix such that a center of each of the plurality of passive RFID transponders is equidistant from the center of each adjacent passive RFID transponder in a first state. The medical device simulator comprises an RFID reader and is configured to determine a position of the medical device simulator relative to the plurality of passive RFID transponders.

In other aspects, the membrane is a flexible membrane.

In other aspects, the human body portion is an artificial human body portion.

In other aspects, the membrane comprises a plurality of pockets formed in the membrane and each of the plurality of passive RFID transponders is at least partially positioned in a corresponding one of the plurality of pockets.

In other aspects, the plurality of retention means comprises a plurality of pockets formed in the membrane and each of the plurality of passive RFID transponders is at least partially positioned in a corresponding one of the plurality of pockets.

In other aspects, at least a portion of each of the plurality of passive RFID transponders is removably inserted into a corresponding pocket.

In other aspects, the plurality of passive RFID transponders are arranged in aligned columns and rows, forming a square pattern.

In other aspects, the plurality of passive RFID transponders are arranged in aligned columns and rows, forming a diamond pattern.

In other aspects, the plurality of passive RFID transponders are arranged in a hexagonal pattern.

In other aspects, the centers of each of the plurality of passive RFID transponders is spaced between 3 mm and 30 mm from the center of each adjacent passive RFID transponder.

In other aspects, the centers of each of the plurality of passive RFID transponders is spaced 18 mm from the center of each adjacent passive RFID transponder.

In other aspects, the medical device simulator is one of a stethoscope, an ultrasound wand, an electrocardiogram (ECG) probe, and a defibrillation pad.

In other aspects, the medical device simulator is a stethoscope comprising a head including a stainless steel body, a spacer coupled to the stainless steel body, a ferrite disc, a faceplate, and an RFID antenna communicatively coupled to the RFID reader. The ferrite disc and the RFID antenna are positioned between the spacer and the faceplate.

In additional aspects, the disclosure herein describes RFID-based motion tracking systems and methods for providing medical device feedback during simulation.

In some aspects, the techniques described herein relate to a radio frequency identification (RFID)-based motion tracking system configured to provide medical device feedback during simulation, the RFID-based motion tracking system including: a plurality of passive RFID transponders forming part of an RFID matrix membrane and configured to be positioned proximate to at least one human body portion, wherein each of the RFID transponders has an X-position and a Y-position relative to the RFID matrix membrane; a medical device simulator including an RFID reader configured detect respective RFID signals and X-Y coordinates from each of the plurality of passive RFID transponders; an application (app) including computing instructions for analyzing one or more RFID signals detected by the RFID reader from the plurality of passive RFID transponders, the app configured for installation and storage on a computer memory of a computing device, wherein the computing instructions of the app, when executed by one or more processors of the computing device, cause the one or more processors to: receive RFID signal data and X-Y coordinate data as detected by the RFID reader from at least a portion of the plurality of passive RFID transponders, and analyze the RFID signal data and the X-Y coordinate data to determine a position of the medical device simulator relative to the at least one human body portion.

In some aspects, the techniques described herein relate to a RFID motion tracking system, wherein determining the position of the medical device simulator relative to the at least one human body portion includes: determining, from the RFID signal data and the X-Y coordinate data, a first X-position, a first Y-position, and a first signal strength of a first RFID transponder of the plurality of passive RFID transponders, wherein the first signal strength corresponds to a first proximity of the medical device simulator to the first RFID transponder, determining, from the RFID signal data and the X-Y coordinate data, a second X-position, a second Y-position, and a second signal strength of a second RFID transponder of the plurality of passive RFID transponders, wherein the second signal strength corresponds to a second proximity of the medical device simulator to the second RFID transponder, wherein analyzing the RFID signal data and the X-Y coordinate data to determine the position includes generating a weighted RFID signal centroid position based on a weighting of the first signal strength compared to the second signal strength, wherein (1) the weighted RFID signal centroid position is nearer to the first RFID transponder when the first signal strength is greater than the second signal strength, (2) the weighted RFID signal centroid position is nearer to the second RFID transponder when the second signal strength is greater than the first signal strength, and (3) the weighted RFID signal centroid position is equidistant from the first RFID transponder and the second RFID transponder when the first signal strength is equal to the second signal strength.

In some aspects, the techniques described herein relate to a RFID motion tracking system, wherein determining the position of the medical device simulator relative to the at least one human body portion further includes: determining, from the RFID signal data and the X-Y coordinate data, a first X-position, a first Y-position, and a first signal strength of a first RFID transponder of the plurality of passive RFID transponders, wherein the first signal strength corresponds to a first proximity of the medical device simulator to the first RFID transponder, determining, from the RFID signal data and the X-Y coordinate data, a second X-position, a second Y-position, and a second signal strength of a second RFID transponder of the plurality of passive RFID transponders, wherein the second signal strength corresponds to a second proximity of the medical device simulator to the second RFID transponder, determining, from the RFID signal data and the X-Y coordinate data, a third X-position, a third Y-position, and a third signal strength of a third RFID transponder of the plurality of passive RFID transponders, wherein the third signal strength corresponds to a third proximity of the medical device simulator to the third RFID transponder, wherein analyzing the RFID signal data and the X-Y coordinate data to determine the position includes generating a weighted RFID signal centroid position based on a weighting of each of the first signal, the second signal strength and the third signal strength, wherein the weighted centroid position is adjusted toward each of the first RFID transponder, the second RFID transponder, and/or the third RFID transponder proportionally based on a weighted magnitude of each of the first signal strength, second signal strength, and/or third signal strength, respectively.

In some aspects, the techniques described herein relate to a RFID motion tracking system, wherein the computing instructions of the app, when executed by one or more processors of the computing device, further cause the one or more processors to: output a feedback indication corresponding to the position of the medical device simulator compared to a reference position for the at least one human body portion.

In some aspects, the techniques described herein relate to a RFID motion tracking system, wherein the feedback indication is at least one of: an audible indication output by a speaker or a visual indication output to a display screen.

In some aspects, the techniques described herein relate to a RFID motion tracking system, wherein at least one of: (a) the visual indication includes one or more graphics depicting a graphical area of the body representative of the human body portion and a location marker indicating the position of the medical device simulator relative to the graphical area of the body; (b) the visual indication includes a graphic or text indicating a positioning score having a value corresponding to accurate placement of the medical device simulator relative to the reference position; or (c) the audible indication includes one or more sounds output based on the position of the medical device simulator relative to one or more groups of passive RFID transponders selected from the plurality of passive RFID transponders.

In some aspects, the techniques described herein relate to a RFID motion tracking system, wherein the medical device simulator includes a device processor communicatively coupled to the RFID reader, and wherein the device processor is configured to receive the RFID signal data from at least a portion of the plurality of passive RFID transponders, and wherein the device processor is configured to transmit the RFID signal data to a processor of the computing device for input into the app.

In some aspects, the techniques described herein relate to a RFID motion tracking system, wherein the computing instructions of the app, when executed by the one or more processors of the computing device, further causes the one or more processors to: define an X-Y coordinate plane corresponding to a surface of the RFID matrix membrane, the X-Y coordinate plane mapped relative to the RFID matrix membrane based on respective X-Y coordinates of the plurality of passive RFID transponders, generate one or more zones defined within the X-Y coordinate plane, wherein each zone of the one or more zones includes an area of the RFID matrix membrane defined by a passive RFID transponder subset, the RFID transponder subset including one or more passive RFID transponders selected from the plurality of passive RFID transponders, and wherein each zone defines a zone type and a variable having a magnitude that adapts based on a relative proximity of the position of the medical device simulator within the zone, determine a current X-Y coordinate within the X-Y coordinate plane as the position of the medical device simulator; and identify a current zone of the one or more zones, the current zone having the current X-Y coordinate, wherein the medical device simulator is positioned within the current zone.

In some aspects, the techniques described herein relate to a RFID motion tracking system, wherein the current X-Y coordinate is positioned within at least two of the one or more zones that overlap within the X-Y coordinate plane, and wherein the current zone is selected as the zone having the variable with a greatest magnitude.

In some aspects, the techniques described herein relate to a RFID motion tracking system, wherein the variable defines sound volume of human organ or a medical condition, and wherein the magnitude of the sound volume adapts based on the relative proximity of the position of the medical device simulator within the current zone.

In some aspects, the techniques described herein relate to a RFID motion tracking system, wherein the current X-Y coordinate is positioned within the current zone and a second zone of the one or more zones, wherein the current zone and the second zone overlap within the X-Y coordinate plane, and wherein a second magnitude of a second sound volume adapts based on a second relative proximity of the position of the medical device simulator within the second zone.

In some aspects, the techniques described herein relate to a RFID motion tracking system, wherein generating the one or more zones of the X-Y coordinate plane includes: displaying on a display screen a graphical representation of the RFID matrix membrane, wherein the graphical representation of the RFID matrix membrane graphically depicts locations of the plurality of passive RFID transponders; and receiving one or more user selections marking one or more graphical contours overlayed on the graphical representation of the RFID matrix membrane, wherein each of the one or more graphical contours defines the one or more zones.

In some aspects, the techniques described herein relate to a RFID motion tracking system, wherein each of the one or more graphical contours is graphically displayed on a display device as corresponding one or more heatmaps, wherein a color intensity of a heatmap of the one or more heatmaps representing the current zone is updated based on the relative proximity of the position of the medical device simulator within the current zone.

In some aspects, the techniques described herein relate to a radio frequency identification (RFID)-based motion tracking method for providing medical device feedback during simulation, the RFID-based motion tracking method including: receiving, at an application (app) installed on a memory of a computing device, RFID signal data and X-Y coordinate data from at least a portion of a plurality of passive RFID transponders, wherein the RFID signal data and the X-Y coordinate data is detected by an RFID reader of a medical device simulator, wherein the plurality of passive RFID transponders form part of an RFID matrix membrane and are configured to be positioned proximate to at least one human body portion, wherein each of the RFID transponders has an X-position and a Y-position relative to the RFID matrix membrane; and analyzing, by the app, the RFID signal data and the X-Y coordinate data to determine a position of the medical device simulator relative to the at least one human body portion.

In some aspects, the techniques described herein relate to a RFID motion tracking method, wherein determining the position of the medical device simulator relative to the at least one human body portion includes: determining, from the RFID signal data and the X-Y coordinate data, a first X-position, a first Y-position, and a first signal strength of a first RFID transponder of the plurality of passive RFID transponders, wherein the first signal strength corresponds to a first proximity of the medical device simulator to the first RFID transponder, determining, from the RFID signal data and the X-Y coordinate data, a second X-position, a second Y-position, and a second signal strength of a second RFID transponder of the plurality of passive RFID transponders, wherein the second signal strength corresponds to a second proximity of the medical device simulator to the second RFID transponder, wherein analyzing the RFID signal data and the X-Y coordinate data to determine the position includes generating a weighted RFID signal centroid position based on a weighting of the first signal strength compared to the second signal strength, wherein (1) the weighted RFID signal centroid position is nearer to the first RFID transponder when the first signal strength is greater than the second signal strength, (2) the weighted RFID signal centroid position is nearer to the second RFID transponder when the second signal strength is greater than the first signal strength, and (3) the weighted RFID signal centroid position is equidistant from the first RFID transponder and the second RFID transponder when the first signal strength is equal to the second signal strength.

In some aspects, the techniques described herein relate to a RFID motion tracking method, wherein determining the position of the medical device simulator relative to the at least one human body portion further includes: determining, from the RFID signal data and the X-Y coordinate data, a first X-position, a first Y-position, and a first signal strength of a first RFID transponder of the plurality of passive RFID transponders, wherein the first signal strength corresponds to a first proximity of the medical device simulator to the first RFID transponder, determining, from the RFID signal data and the X-Y coordinate data, a second X-position, a second Y-position, and a second signal strength of a second RFID transponder of the plurality of passive RFID transponders, wherein the second signal strength corresponds to a second proximity of the medical device simulator to the second RFID transponder, determining, from the RFID signal data and the X-Y coordinate data, a third X-position, a third Y-position, and a third signal strength of a third RFID transponder of the plurality of passive RFID transponders, wherein the third signal strength corresponds to a third proximity of the medical device simulator to the third RFID transponder, wherein analyzing the RFID signal data and the X-Y coordinate data to determine the position includes generating a weighted RFID signal centroid position based on a weighting of each of the first signal, the second signal strength and the third signal strength, wherein the weighted centroid position is adjusted toward each of the first RFID transponder, the second RFID transponder, and/or the third RFID transponder proportionally based on a weighted magnitude of each of the first signal strength, second signal strength, and/or third signal strength, respectively.

In some aspects, the techniques described herein relate to a RFID motion tracking method further including: outputting a feedback indication corresponding to the position of the medical device simulator compared to a reference position for the at least one human body portion.

In some aspects, the techniques described herein relate to a RFID motion tracking method, wherein the feedback indication is at least one of: an audible indication output by a speaker or a visual indication output to a display screen.

In some aspects, the techniques described herein relate to a RFID motion tracking method, wherein at least one of: (a) the visual indication includes one or more graphics depicting a graphical area of the body representative of the human body portion and a location marker indicating the position of the medical device simulator relative to the graphical area of the body; (b) the visual indication includes a graphic or text indicating a positioning score having a value corresponding to accurate placement of the medical device simulator relative to the reference position; or (c) the audible indication includes one or more sounds output based on the position of the medical device simulator relative to one or more groups of passive RFID transponders selected from the plurality of passive RFID transponders.

In some aspects, the techniques described herein relate to a RFID motion tracking method, wherein the medical device simulator includes a device processor communicatively coupled to the RFID reader, and wherein the device processor is configured to receive the RFID signal data from at least a portion of the plurality of passive RFID transponders, and wherein the device processor is configured to transmit the RFID signal data to a processor of the computing device for input into the app.

In some aspects, the techniques described herein relate to a RFID motion tracking method further including: defining an X-Y coordinate plane corresponding to a surface of the RFID matrix membrane, the X-Y coordinate plane mapped relative to the RFID matrix membrane based on respective X-Y coordinates of the plurality of passive RFID transponders, generating one or more zones defined within the X-Y coordinate plane, wherein each zone of the one or more zones includes an area of the RFID matrix membrane defined by a passive RFID transponder subset, the RFID transponder subset including one or more passive RFID transponders selected from the plurality of passive RFID transponders, and wherein each zone defines a zone type and a variable having a magnitude that adapts based on a relative proximity of the position of the medical device simulator within the zone, determining a current X-Y coordinate within the X-Y coordinate plane as the position of the medical device simulator; and identifying a current zone of the one or more zones, the current zone having the current X-Y coordinate, wherein the medical device simulator is positioned within the current zone.

In some aspects, the techniques described herein relate to a RFID motion tracking method, wherein the current X-Y coordinate is positioned within at least two of the one or more zones that overlap within the X-Y coordinate plane, and wherein the current zone is selected as the zone having the variable with a greatest magnitude.

In some aspects, the techniques described herein relate to a RFID motion tracking method, wherein the variable defines sound volume of human organ or a medical condition, and wherein the magnitude of the sound volume adapts based on the relative proximity of the position of the medical device simulator within the current zone.

In some aspects, the techniques described herein relate to a RFID motion tracking method, wherein the current X-Y coordinate is positioned within the current zone and a second zone of the one or more zones, wherein the current zone and the second zone overlap within the X-Y coordinate plane, and wherein a second magnitude of a second sound volume adapts based on a second relative proximity of the position of the medical device simulator within the second zone.

In some aspects, the techniques described herein relate to a RFID motion tracking method, wherein generating the one or more zones of the X-Y coordinate plane includes: displaying on a display screen a graphical representation of the RFID matrix membrane, wherein the graphical representation of the RFID matrix membrane graphically depicts locations of the plurality of passive RFID transponders; and receiving one or more user selections marking one or more graphical contours overlayed on the graphical representation of the RFID matrix membrane, wherein each of the one or more graphical contours defines the one or more zones.

In some aspects, the techniques described herein relate to a RFID motion tracking method, wherein each of the one or more graphical contours is graphically displayed on a display device as corresponding one or more heatmaps, wherein a color intensity of a heatmap of the one or more heatmaps representing the current zone is updated based on the relative proximity of the position of the medical device simulator within the current zone.

In some aspects, the techniques described herein relate to a tangible, non-transitory computer-readable medium storing instructions for providing medical device feedback during simulation, that when executed by one or more processors cause the one or more processors to: receive, at an application (app) installed on a memory of a computing device, RFID signal data and X-Y coordinate data from at least a portion of a plurality of passive RFID transponders, wherein the RFID signal data and the X-Y coordinate data is detected by an RFID reader of a medical device simulator, wherein the plurality of passive RFID transponders form part of an RFID matrix membrane and are configured to be positioned proximate to at least one human body portion, wherein each of the RFID transponders has an X-position and a Y-position relative to the RFID matrix membrane; and analyze, by the app, the RFID signal data and the X-Y coordinate data to determine a position of the medical device simulator relative to the at least one human body portion.

The present disclosure relates to improvement to other technologies or technical fields at least because the systems and methods disclosed herein describe use of RFID matrix membrane for improving fidelity and accuracy of a position of a medical device simulator. Such improvements enhance the field of medical device simulation because the plurality of passive RFID transponders of the RFID matrix membrane are arranged in a pattern that create an X-Y coordinate plane that can be tracked as a continuous value or variable across a surface of the RFID matrix membrane. This improves over conventional prior art that allows for only discrete locations requiring wiring at a location, and where such wiring can cause interference, can cause false positive feedback, and can increase manufacturing complexity and lower product reliability when compared to the improvements of the disclosed systems and methods.

In addition, the present disclosure includes applying certain aspects or features, as described herein, with, or by the use of, a particular machine, e.g., an RFID matrix membrane. In addition, a further use of particular machine includes the medical device simulator, which is configured to interact with the RFID matrix membrane by reading one or more of the passive RFID transponders positioned in the matrix membrane.

The present disclosure includes effecting a transformation or reduction of a particular article to a different state or thing, e.g., transformation or reduction of RFID signal data and X-Y coordinate data as detected from the RFID matrix membrane into a position of the medical device simulator relative to at least one human body portion, which can be an artificial human body portion (e.g., a chest area) for training medical practitioners.

The present disclosure includes specific features other than what is well-understood, routine, conventional activity in the field, or adding unconventional steps that confine the claim to a particular useful application, e.g., a RFID matrix membrane and systems thereof, and, also, e.g., RFID-based motion tracking systems and methods for providing medical device feedback during simulation.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed therein. It should be understood that each Figure depicts an embodiment of a particular aspect of the disclosed system and methods, and that each of the Figures is intended to accord with a possible embodiment thereof. Further, whenever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

DETAILED DESCRIPTION

Figure 1:
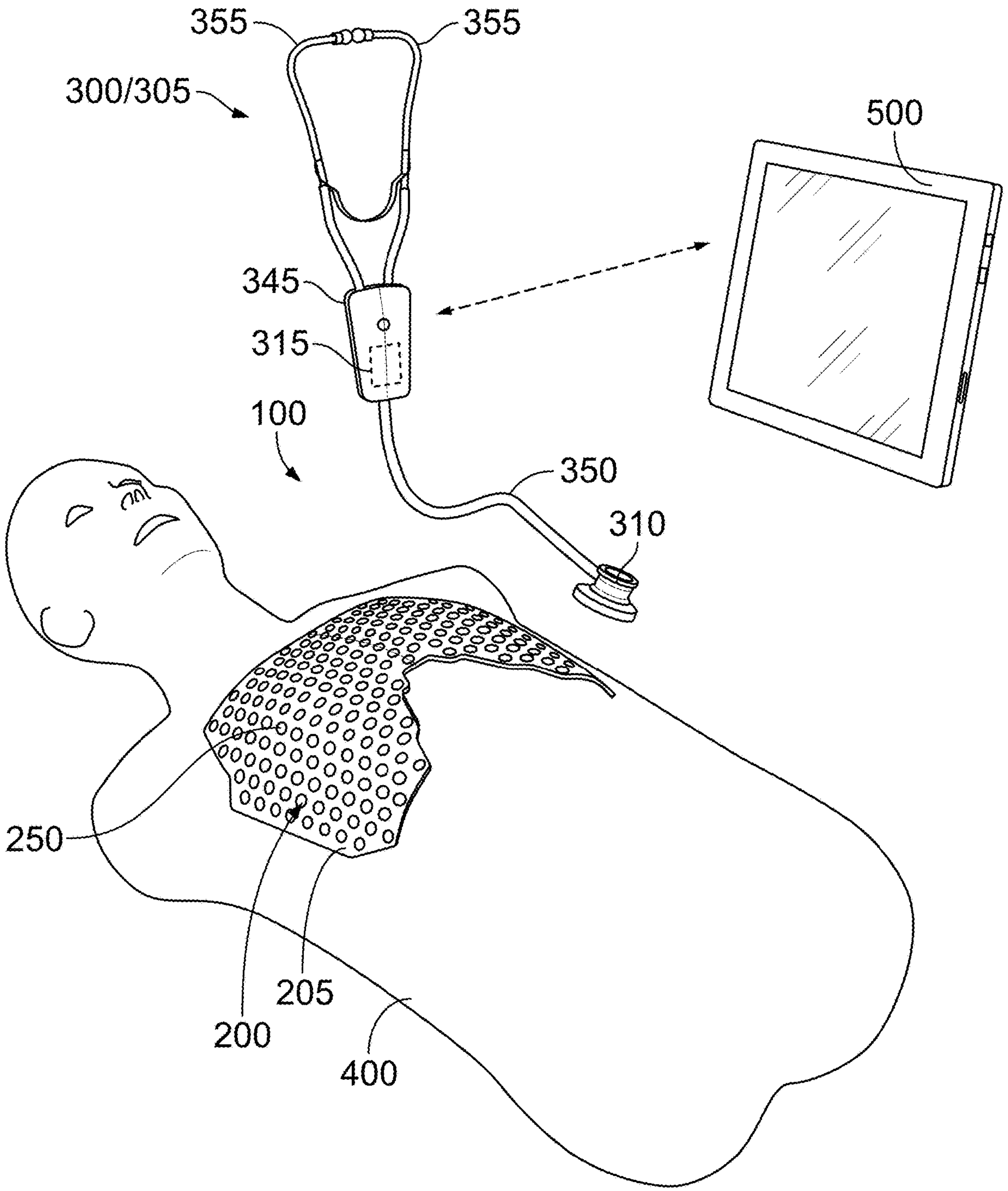
FIG. 1 illustrates an example position detection system, in accordance with various embodiments herein.

While the systems and methods disclosed herein is susceptible of being embodied in many different forms, it is shown in the drawings and will be described herein in detail specific exemplary embodiments thereof, with the understanding that the present disclosure is to be considered as an exemplification of the principles of the systems and methods disclosed herein and is not intended to limit the systems and methods disclosed herein to the specific embodiments illustrated. In this respect, before explaining at least one embodiment consistent with the present systems and methods disclosed herein in detail, it is to be understood that the systems and methods disclosed herein is not limited in its application to the details of construction and to the arrangements of components set forth above and below, illustrated in the drawings, or as described in the examples. Methods and apparatuses consistent with the systems and methods disclosed herein are capable of other embodiments and of being practiced and carried out in various ways. Also, it is to be understood that the phraseology and terminology employed herein, as well as the abstract included below, are for the purposes of description and should not be regarded as limiting.

a Radio-Frequency Identification (RFID) Matrix Membrane and a Position Detection System with an RFID Matrix Membrane FIG. 1 illustrates an example position detection system 100 that can be used to provide position feedback of a simulated medical instrument with respect to a simulated environment. Position detection system 100 generally includes an RFID matrix membrane 200 and a medical device simulator 300, which can be configured to communicate with an external computing device 500, as discussed in more detail below. In the implementation shown, RFID matrix membrane 200 is configured to be positioned on a human body portion 400 (e.g., an artificial human body portion, such as a mannequin, an actual human body portion, etc.) and medical device simulator 300 is a stethoscope 305, such that position detection system 100 can be used for can be used for auscultation training. In other implementations, medical device simulator 300 could be another simulated medial instrument, such as an ultrasound wand, an electrocardiogram (ECG) probe, a defibrillation pad, etc., and position detection system 100 can be used for training of other medical procedures to provide position feedback of medical device simulator 300 with respect to RFID matrix membrane 200.

Figure 2:
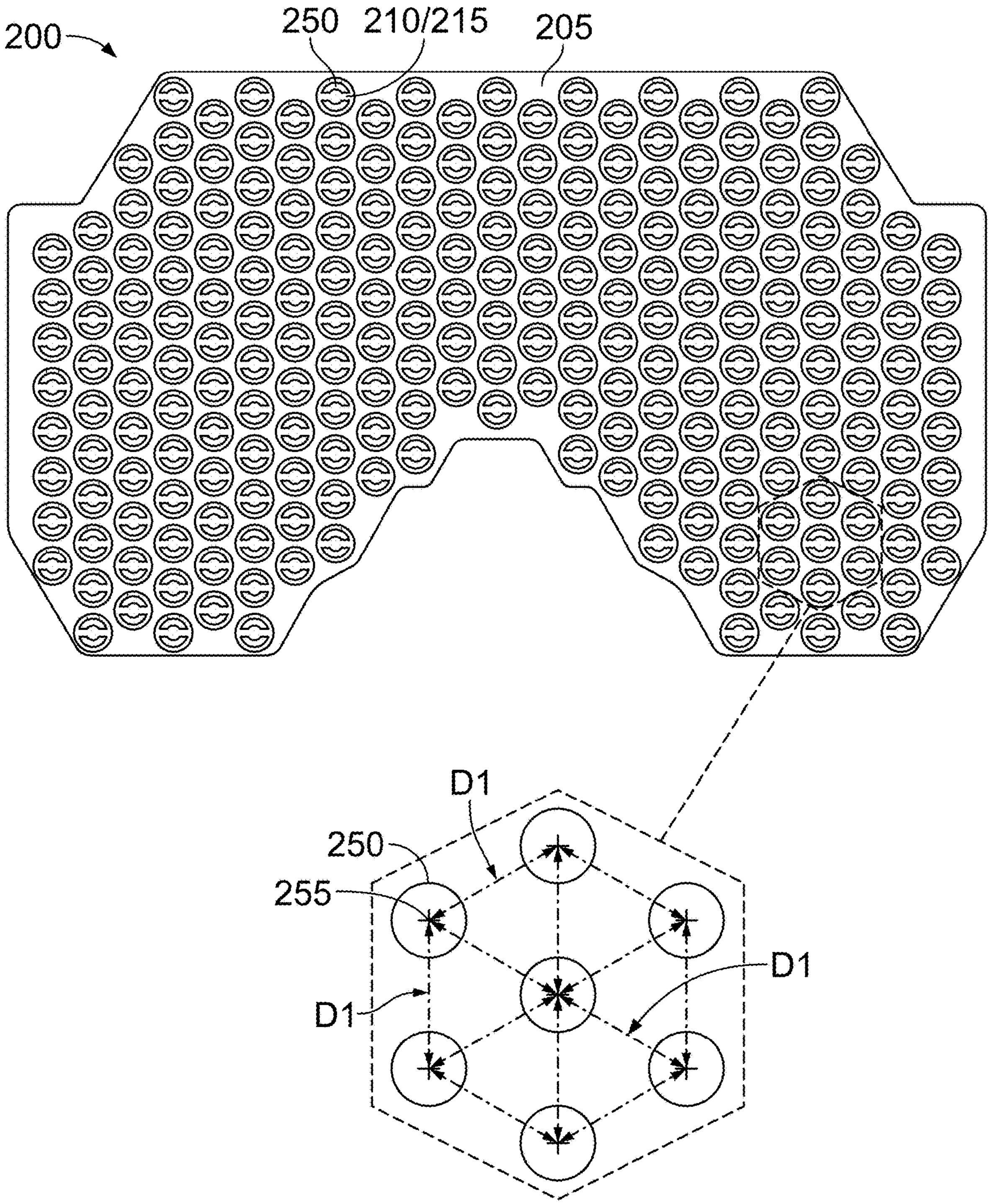
FIG. 2 illustrates a front plan view of a first example RFID matrix membrane, in accordance with various embodiments herein.

FIG. 2 illustrates a first example RFID matrix membrane 200, which can be used in position detection system 100. RFID matrix membrane 200 generally includes a membrane 205 and a plurality of passive RFID transponders 250. Passive RFID transponders can be used in RFID matrix membrane 200 to alleviate production complexity that can be induced by costly and fragile wiring that may be required for active components. Membrane 205 is configured to be positioned proximate to human body portion 400 and, in the implementation shown, is a flexible membrane (e.g., silicone), which can allow membrane 205 to form to human body portion 400 and can allow membrane 205 to be used in certain training where external forces are applied, such as cardiac pulmonary resuscitation (CPR) training, without damage to plurality of passive RFID transponders 250. In other implementations, membrane 205 could be rigid (e.g., a plastic body of a mannequin, a polyimide matrix covered with epoxy, etc.).

Figure 5:
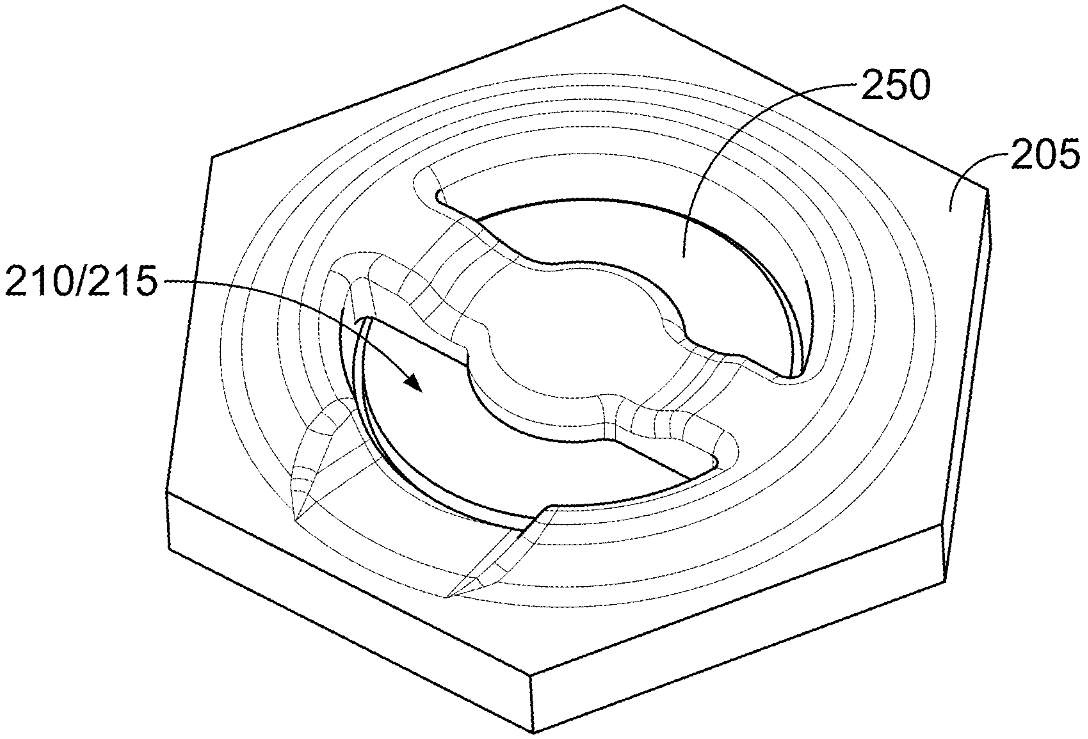
FIG. 5 illustrates a bottom perspective view of a portion of the membrane of the RFID matrix membrane of FIGS. 3-5, in accordance with various embodiments herein.
Figure 6:
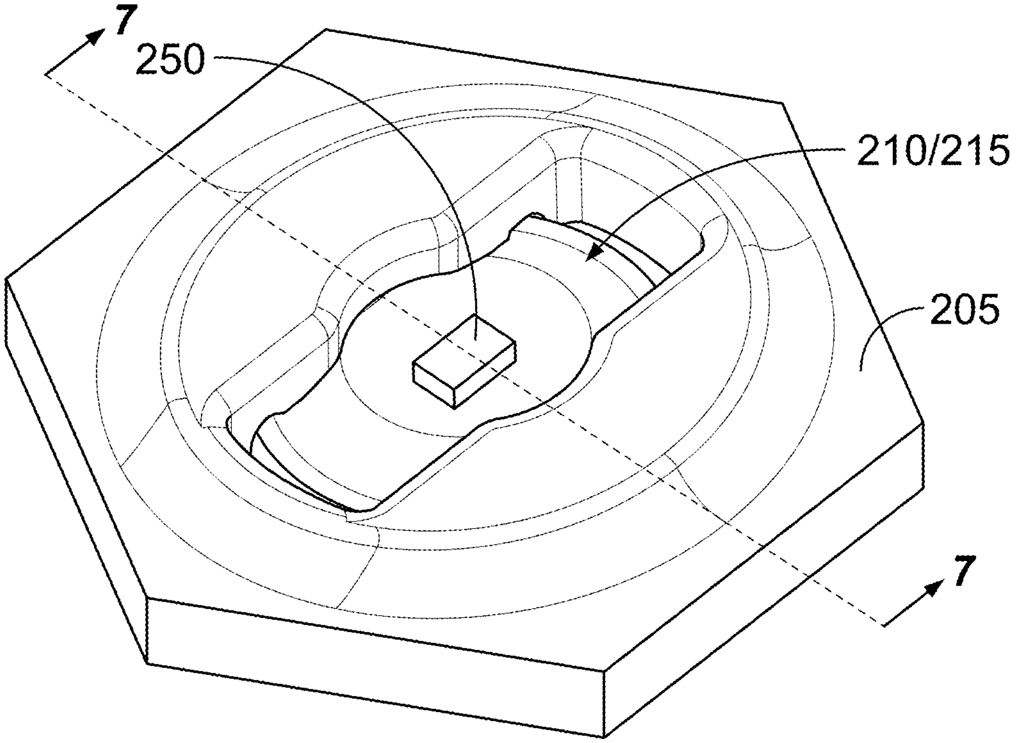
FIG. 6 illustrates a top perspective view of the portion of the membrane of FIG. 5, in accordance with various embodiments herein.
Figure 7:
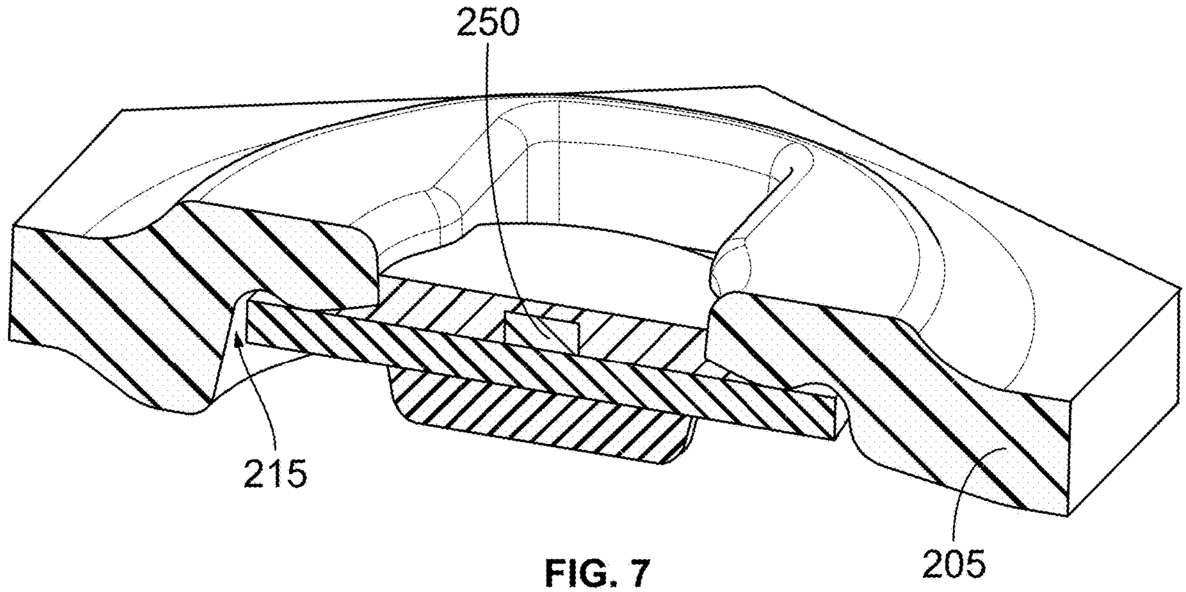
FIG. 7 illustrates a cross-section of the portion of the membrane of FIG. 6 taken along line 7-7 in FIG. 6, in accordance with various embodiments herein.

Membrane 205 includes a plurality of retention means 210 that are arranged in a matrix for affixing each of plurality of passive RFID transponders 250 to membrane 205. As best seen in FIGS. 5-7, in the implementation shown, plurality of retention means 210 includes a plurality of pockets 215 that are formed in membrane 205 and have cavities to receive plurality of passive RFID transponders 250. Locating plurality of passive RFID transponders 250 in cavities of plurality of pockets 215 in membrane 205 allows plurality of passive RFID transponders 250 to "float" such that forces applied to membrane 205 (e.g., forces induced by CPR maneuvers) are shifted away from plurality of passive RFID transponders 250. Each of plurality of passive RFID transponders 250 is at least partially positioned in a corresponding one of plurality of pockets 215. In the example shown, plurality of passive RFID transponders 250 are fully positioned in plurality of pockets 215, however, plurality of passive RFID transponders 250 could be partially inserted into plurality of pockets 215 such that a portion of each plurality of passive RFID transponders 250 located in one of plurality of pockets 215 and another portion extends outside. In addition, at least a portion of each of plurality of passive RFID transponders 250 can removably inserted in a corresponding one of plurality of pockets 215, which can allow for removal and repair/replacement of plurality of passive RFID transponders 250 should one be damaged, fail, or require repair or reprogramming. In other implementations, plurality of passive RFID transponders 250 can be permanently affixed to membrane 205 (e.g., molded into membrane 205). In implementations where there are areas of potential puncture points where needle chest decompression training may be performed, some plurality of pockets 215 could be left empty.

Each of plurality of passive RFID transponders 250 is affixed to membrane 205 via one of the plurality of retention means 210 (e.g., each of plurality of passive RFID transponders 250 is at least partially inserted into a corresponding plurality of pockets 215 in membrane 205), such that plurality of passive RFID transponders 250 are arranged in the matrix and center 255 of each of plurality of passive RFID transponders 250 is equidistant from a center 255 of each adjacent passive RFID transponder 250 with membrane 205 in the first state. In the implementation shown, the first state is with membrane 205 laid flat in a planar configuration. The distance between centers 255 can change when membrane 205 is positioned in other states, such as when membrane 205 laid on a torso, wrapped around a leg, during CPR, etc., In the implementation shown, plurality of passive RFID transponders 250 are arranged in a hexagonal pattern, such that a center 255 of each of plurality of passive RFID transponders 250 is spaced a distance D1 of approximately 18 millimeters from the center 255 of each adjacent passive RFID transponder 250 with membrane 205 in the first state. In other implementations, distance D1 could be approximately 3 millimeters to 30 millimeters.

Plurality of passive RFID transponders 250 are each configured to provide a respective signal strength and an X-Y coordinate (e.g., the physical/mechanical X-Y position stored in the memory of the transponder) that is detectable by an RFID reader 315 of medical device simulator 300 for determining a position of medical device simulator 300 relative to plurality of passive RFID transponders 250. In other embodiments, rather than storing and providing the X-Y coordinate, each of plurality of passive RFID transponders 250 can store and provide a unique identifier (UID) and position detection system 100 can use a lookup table that stores the X-Y position for each UID of each transponder.

Figure 3:
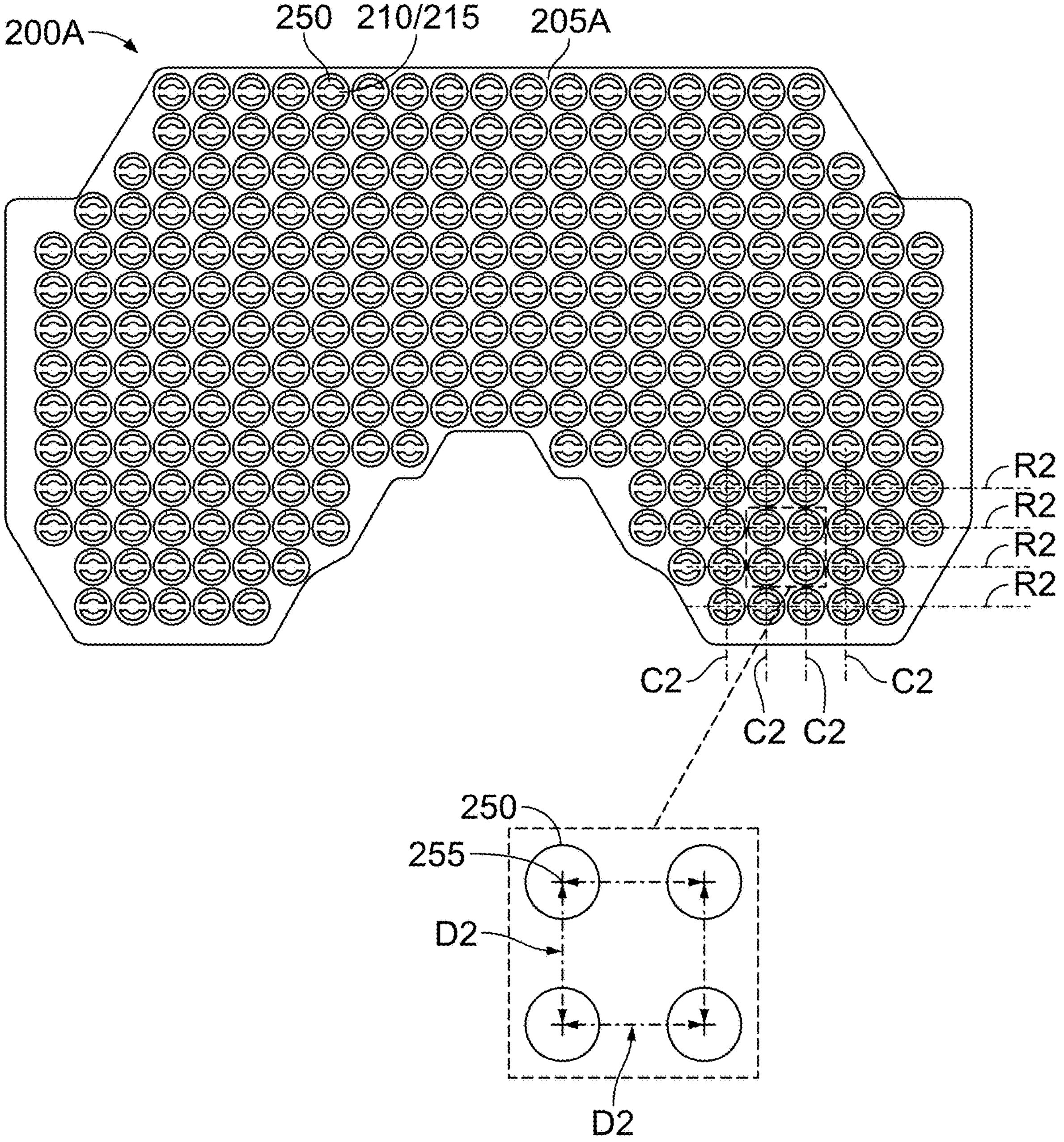
FIG. 3 illustrates a front plan view of a second example RFID matrix membrane, in accordance with various embodiments herein.

FIG. 3 illustrates a second example RFID matrix membrane 200A, which is substantially the same as RFID matrix membrane 200, except that plurality of passive RFID transponders 250 are arranged on membrane 205A in aligned columns C2 and rows R2, forming a square pattern, rather than a hexagonal pattern. In the implementation shown, center 255 of each of plurality of passive RFID transponders 250 is spaced a distance D2 of approximately 18 millimeters from the center 255 of each adjacent passive RFID transponder 250. In other implementations, distance D2 could be approximately 3 millimeters to 30 millimeters.

Figure 4:
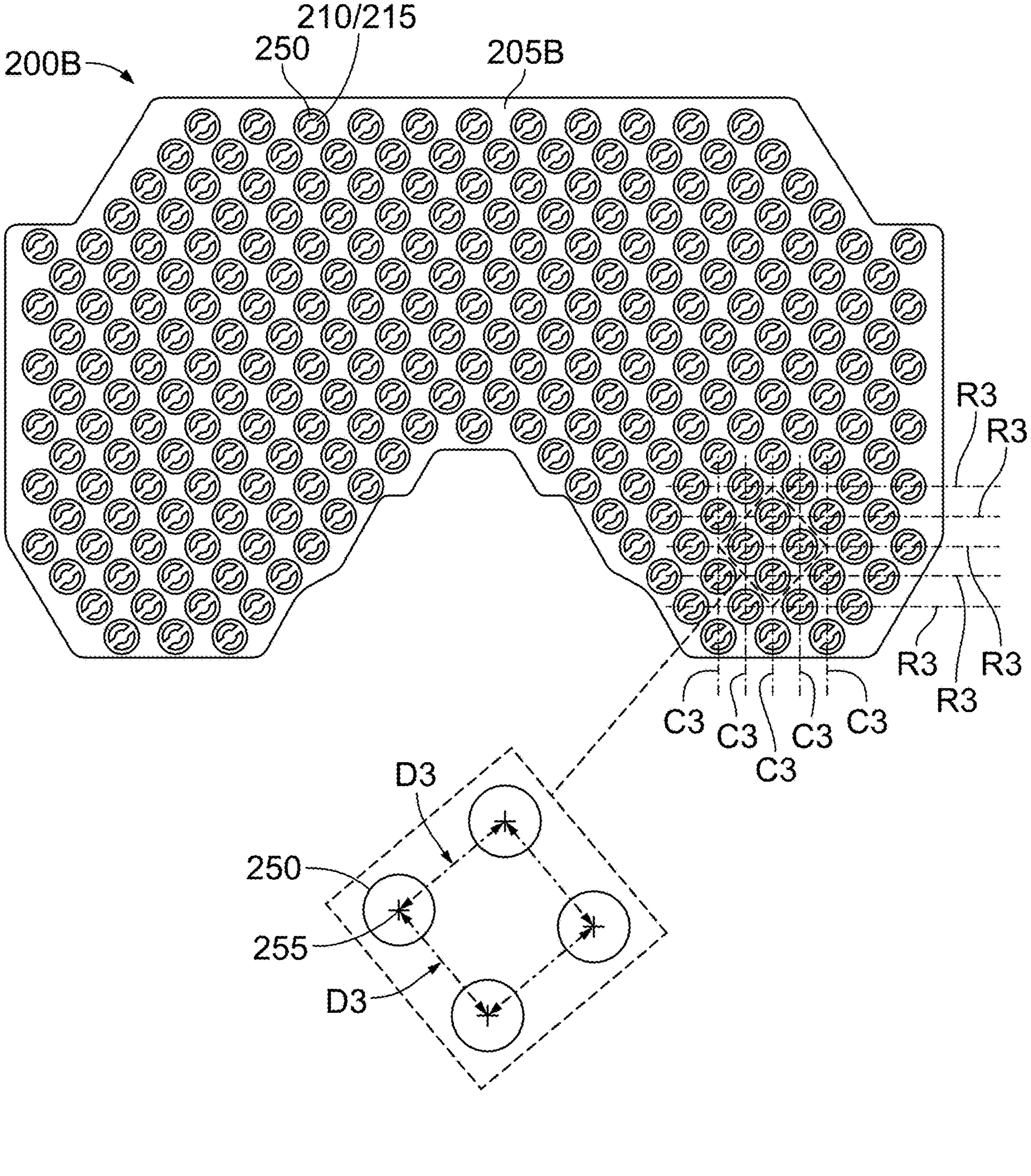
FIG. 4 illustrates a front plan view of a third example RFID matrix membrane, in accordance with various embodiments herein.

FIG. 4 illustrates a third example RFID matrix membrane 200B, which is substantially the same as RFID matrix membrane 200, except that plurality of passive RFID transponders 250 are arranged in aligned rows R3 and columns C3, forming a diamond pattern, rather than a hexagonal pattern. In the implementation shown, center 255 of each of plurality of passive RFID transponders 250 is spaced a distance D3 of approximately 18 millimeters from the center 255 of each adjacent passive RFID transponder 250. In other implementations, distance D3 could be approximately 3 millimeters to 30 millimeters.

Figure 8:
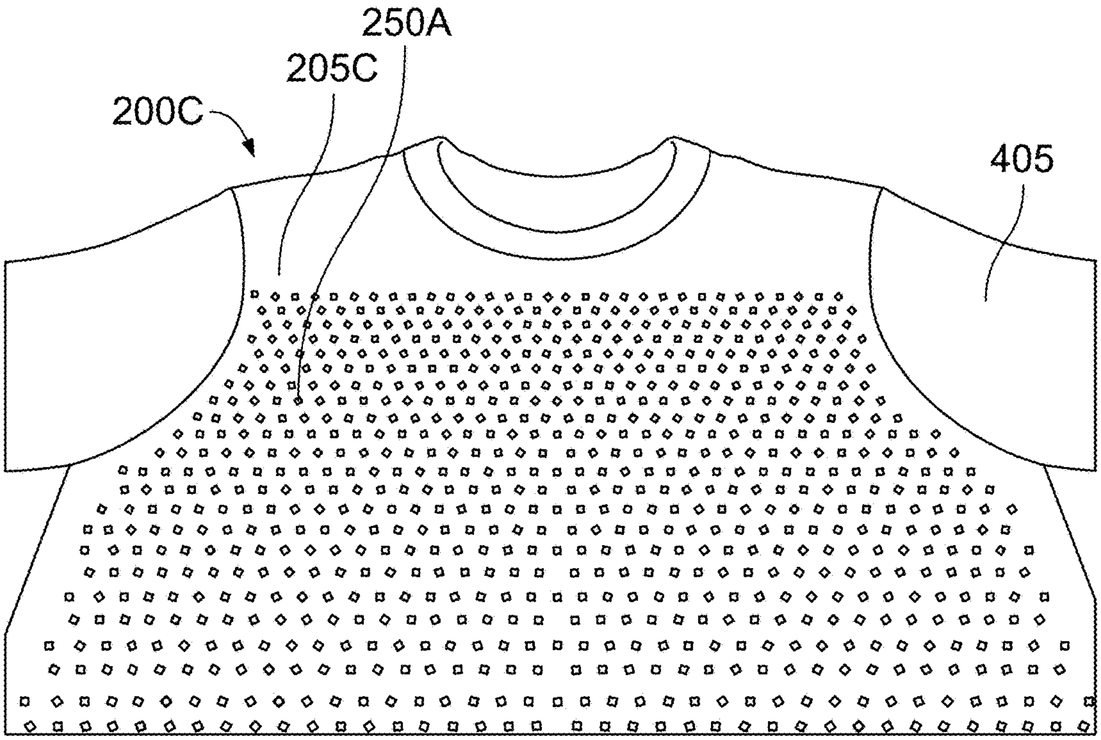
FIG. 8 illustrates a front view of a second example RFID matrix membrane, in accordance with various embodiments herein.

FIG. 8 illustrates a fourth example RFID matrix membrane 200C that is scalable to a training approach typically referred to as "standardized patient", where a human plays the role of a patient. In the implementation shown, a plurality of passive RFID transponders 250A are affixed to a membrane 205C, which is configured to be attached to or is made part of an item of clothing 405 that can be worn by the human, which is shown as a t-shirt. In other implementations, clothing 405 could be pants, socks, arm sleeves, leg sleeves, etc., depending on the training being performed.

Referring back to FIG. 1, medical device simulator 300 comprises RFID reader 315 and is configured to determine a position of medical device simulator 300 relative to plurality of passive RFID transponders 250, as discussed in detail below. In the implementation shown, medical device simulator 300 is a stethoscope 305 that can be used for auscultation training, but in other implementations could be a simulator of any type of medical device that would be useful for training (e.g., a stethoscope, an ultrasound wand, an electrocardiogram (ECG) probe, a defibrillation pad, etc.). In implementations where medical device simulator 300 is an ultrasound wand, medical device simulator 300 can also include an inertial measurement unit (IMU) sensor to detect pitch, yaw, and roll and an optical flow sensor to detect position movement. As shown in FIG. 1, example stethoscope 305 generally includes a near field communication (NFC) reader 345, which includes RFID reader 315, and a head 310 connected to NFC reader 345 via a radio-frequency (RF) cable 350. Ear pieces 355 each extend from NFC reader 345 and each include a speaker or other sound generating device.

Figure 9:
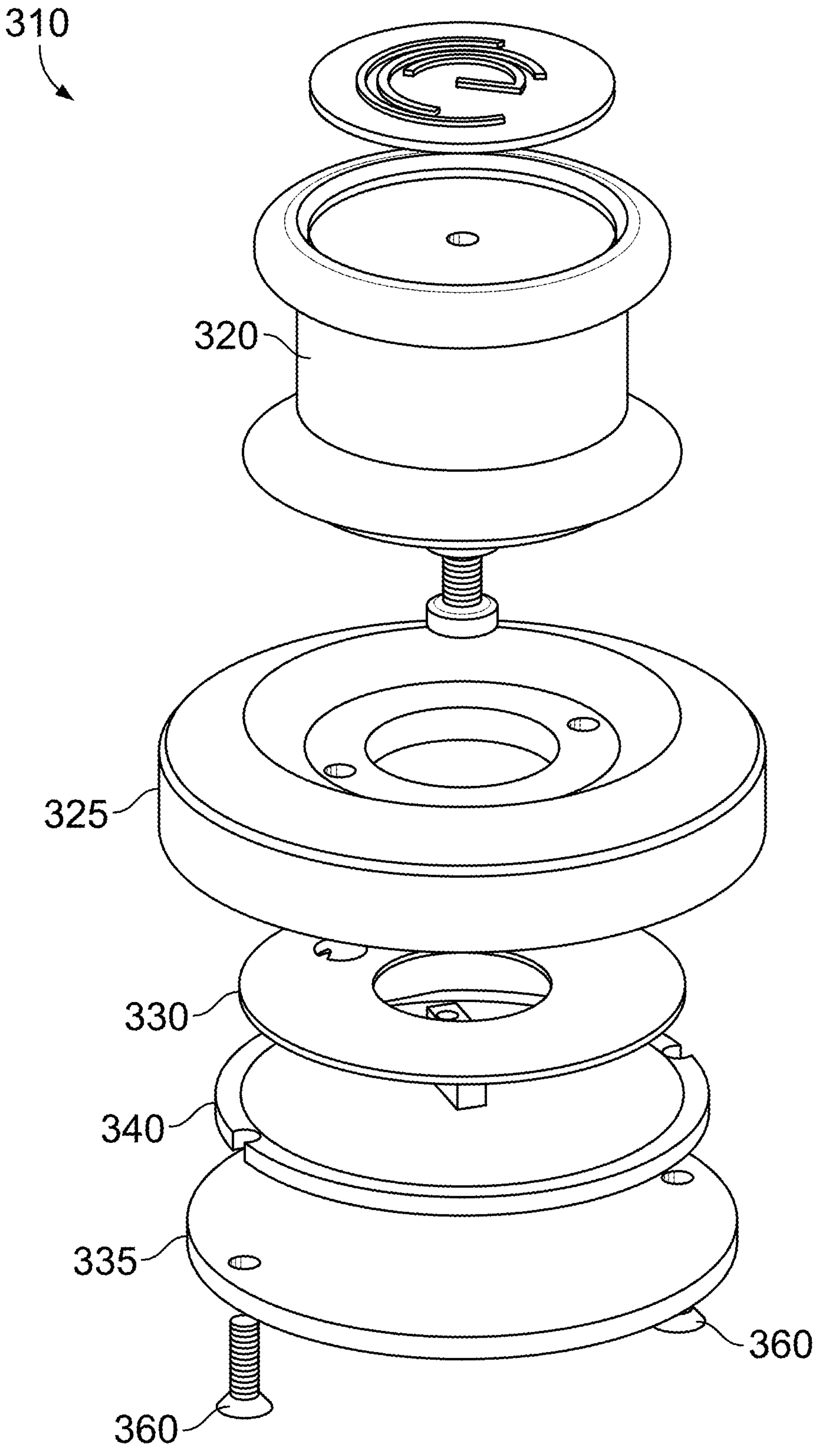
FIG. 9 illustrates an exploded view of an example head of the medical device simulator of FIG. 1, in accordance with various embodiments herein.

FIG. 9 illustrates an exploded view of head 310 of stethoscope 305. In the implementation shown, head 310 includes a stainless steel body 320 that can be used to provide the look and feel of a standard stethoscope. A spacer 325 is coupled to stainless steel body 320 and a ferrite disc 330 and an RFID antenna 340, which is communicatively coupled to RFID reader 315, are positioned between spacer 325 and a faceplate 335. Faceplate 335 can be coupled to spacer 325 via threaded members 360, or any other appropriate means, such that ferrite disc 330 and RFID antenna 340 securely coupled between spacer 325 and a faceplate 335.

Figure 10:
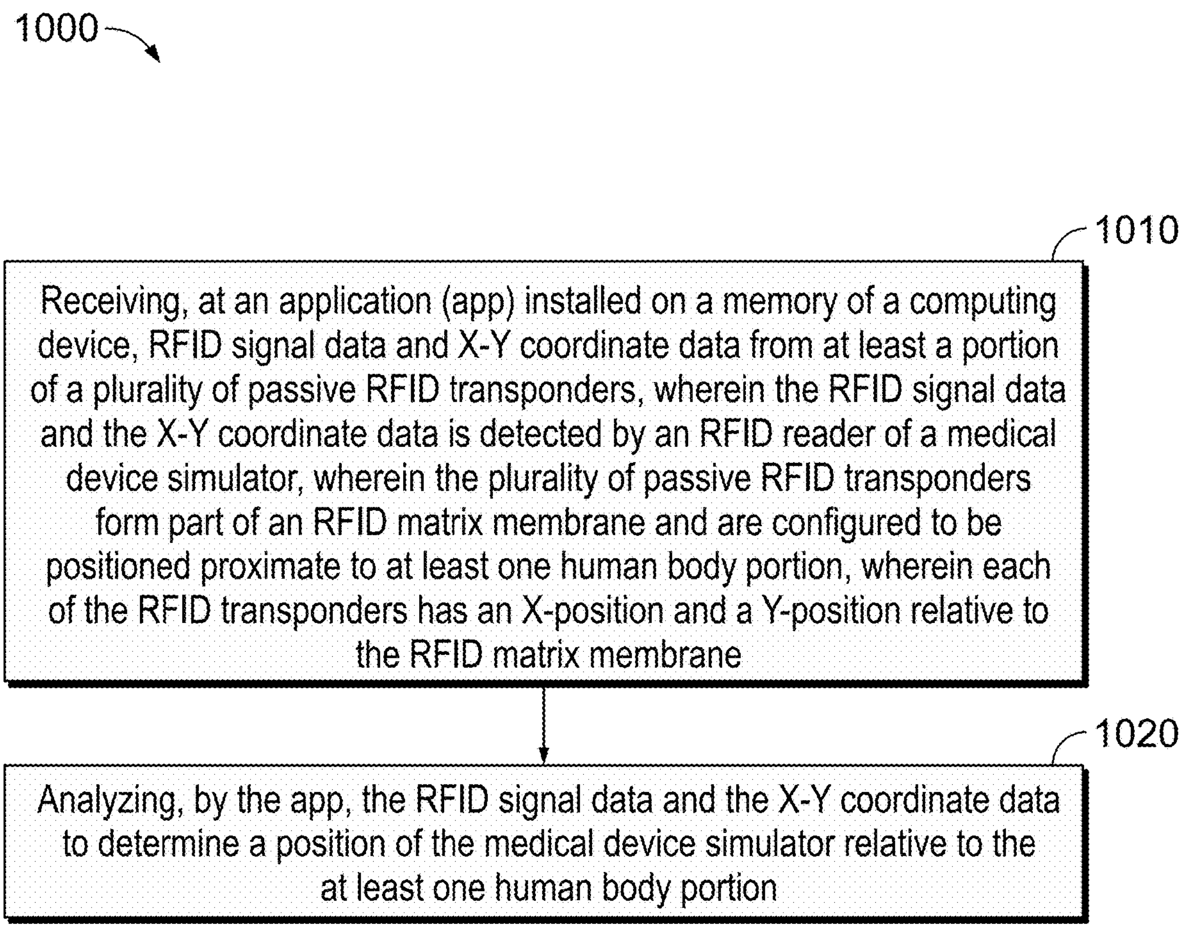
FIG. 10 illustrates an example RFID-based motion tracking method for providing medical device feedback during simulation, in accordance with various embodiments herein.

Radio Frequency Identification (RFID) Based Motion Tracking Systems and Methods for Providing Medical Device Feedback During Simulation FIG. 10 illustrates an example RFID-based motion tracking method 1000 for providing medical device feedback during simulation. Method 1000 may comprise a computer algorithm comprising computing instructions stored in a computer memory and executable by one or more processors. As shown for FIG. 10, at block 1010, method 1000 comprises receiving, at an application (app) installed on a memory of a computing device (e.g., external computing device 500), RFID signal data and X-Y coordinate data from at least a portion of a plurality of passive RFID transponders. For example, as described for FIGS. 1-4, the plurality of passive RFID transponders (e.g., plurality of passive RFID transponders 250) form part of an RFID matrix membrane (e.g., RFID matrix membrane 200) and are configured to be positioned proximate to at least one human body portion (e.g., human body portion 400, e.g., a chest area of an artificial or simulated human body area or otherwise portion thereof. Each of the passive RFID transponders has an X-position and a Y-position relative to the RFID matrix membrane.

Each of the passive RFID transponders can report its X-position and Y-position as respective X-Y coordinates (e.g., an X-coordinate and a Y-coordinate) when read by the RFID reader of a medical device simulator. Each of the passive RFID transponders can also report otherwise provide a signal data to the RFID reader, where the signal data will have a relative signal strength based on a distance or otherwise proximity to the RFID reader. In this way, RFID signal data and X-Y coordinate data can be detected by the RFID reader of a medical device simulator (e.g., medical device simulator 300). As shown in FIG. 1, by way of non-limiting example, the medical device simulator may comprise a simulated stethoscope for purposes of simulating an auscultation procedure (e.g., listing for cardiac sounds).

An external computing device (e.g., external computing device 500) can comprise a computing device (e.g., an APPLE iPad computing device) with one or more processors and a display screen and speaker(s) for outputting visual and/or audible feedback. The one or more processors may comprise an ARM based processor, an ATOM based processor, an INTEL based processor, and/or other similar processors.

Additionally, or alternatively, external computing device 500 may further comprise a mobile device, such as a cellular phone, tablet device, etc., such as an APPLE IPHONE device or GOOGLE ANDROID device. In such embodiments, a display screen of the mobile device as attached or included as part of the mobile device may comprise a graphic user interface (GUI) configured to render graphics or images on the display screen of the mobile device.

In various embodiments, the external computing device (e.g., external computing device 500) may comprise, and/or be communicatively coupled to, one or more computer memories, which may be tangible, non-transitory computer-readable medium (e.g., RAM or ROM) for storing computing instructions (e.g., an app), graphics, images, or the like. The one or more processors of external computing device 500 may execute computing instructions stored in the one or more memories for rendering graphics or images, or for implementing any algorithms, methods, flowcharts, etc. as described herein. The computing instructions may comprise computing instructions implemented in programming languages such as, e.g., C, C++, C#, GO, Java, Python, Ruby, R, or the like.

Still further, the computing device may comprise a transceiver for sending and receiving data (e.g., RFID signal data and/or the X-Y coordinate data), where the data can be received wirelessly (e.g., via the BLUETOOTH protocol) and/or wired such as through as USB or similar port. Wireless signals may comprise any one or more of IEEE 802.11 wireless signals (WIFI), BLUETOOTH signals, or the like. Additionally, or alternatively, a processor of external computing device 500 may be communicatively coupled via wired signals, e.g., via a USB or similar wired connection (not shown). In some aspects, medical device simulator may also include a device processor for sending and receiving data. For example, in some aspects, for example as shown for FIG. 1, the medical device simulator (e.g., medical device simulator 300) can comprise a device processor communicatively coupled to its RFID reader. The device processor of the medical device simulator can be configured to receive the RFID signal data from at least a portion of the plurality of passive RFID transponders positioned in the RFID matrix membrane (e.g., RFID matrix membrane 200). In such aspects, the device processor is configured to transmit the RFID signal data to a processor of the computing device (e.g., external computing device 500) for input into an application (e.g., app), which may be a native app of the computing device for analyzing or implementing any methods or algorithms, for example, as described herein.

For example, the computing device can comprise a computing memory for storing instructions, such as an application (app) as described herein. The app may comprise computing instructions programmed in a native computing language, such as SWIFT code (e.g., native code) for implementing on an operating system native to the computing device (e.g., APPLE iOS). When executed or otherwise implemented by a processor of the external computing device 500, the app may send and/or receive data (e.g., RFID signal data and the X-Y coordinate data) via the transceiver of the computing device. For example, the app (as stored in a memory of external computing device 500 may contain computing instructions executable by a processor of the external computing device 500. The computing instructions may be compiled to execute on the processor or may be otherwise be configured to be interpreted or run by the processor. Such computing instructions may be coded to execute the algorithms, such as the methods and/or flowcharts as described herein. For example, computing instructions of the app may comprise one or more event listeners, such as a listener function programmed to detect and/or receive RFID signal data and X-Y coordinate data as read by the RFID reader from the passive RFID transponders of the RFID matrix membrane. In this way, the RFID signal data and X-Y coordinate data would be read from to, or otherwise received from, the passive RFID transponders of the RFID matrix membrane for providing medical device tracking feedback during simulation, which can include for analyzing the RFID signal data and the X-Y coordinate data to determine a position of the medical device simulator relative to the at least one human body portion, or otherwise, as described herein.

Still further, the app may display graphics, text, or otherwise information on a display screen of a computing device (e.g., external computing device 500). The graphics, text, or otherwise information, may be displayed, for example, via a graphic user interface (GUI) as rendered by the app of the display screen of the computing device.

Further, as shown for FIG. 10, at block 1020, method 1000 comprises analyzing, by the app, the RFID signal data and the X-Y coordinate data to determine a position of the medical device simulator relative to the at least one human body portion. That is, the RFID reader of the medical device simulator reports or provides RFID signal data and the X-Y coordinate data to the app as input. The app then analyzes the RFID signal data and the X-Y coordinate data to generate a position, which can be, by way of non-limiting example, a centroid position, such as a weighted RFID signal centroid position as described for FIG. 11 herein.

Further, in some aspects, the computing instructions of the app, when executed by one or more processors of the computing device, can cause the one or more processors (e.g., a processor of the computing device, a device processor of the medical device similar, or a processor of the RFID flexible membrane itself (not shown)) to output a feedback indication corresponding to the position of the medical device simulator compared to a reference position for the at least one human body portion. The reference position can be a simulated location of human body organ (e.g., heart or lung area) or other known human body location (e.g., a chest area, stomach area, or foot area, or a zone or portion thereof as described herein).

Figure 11:
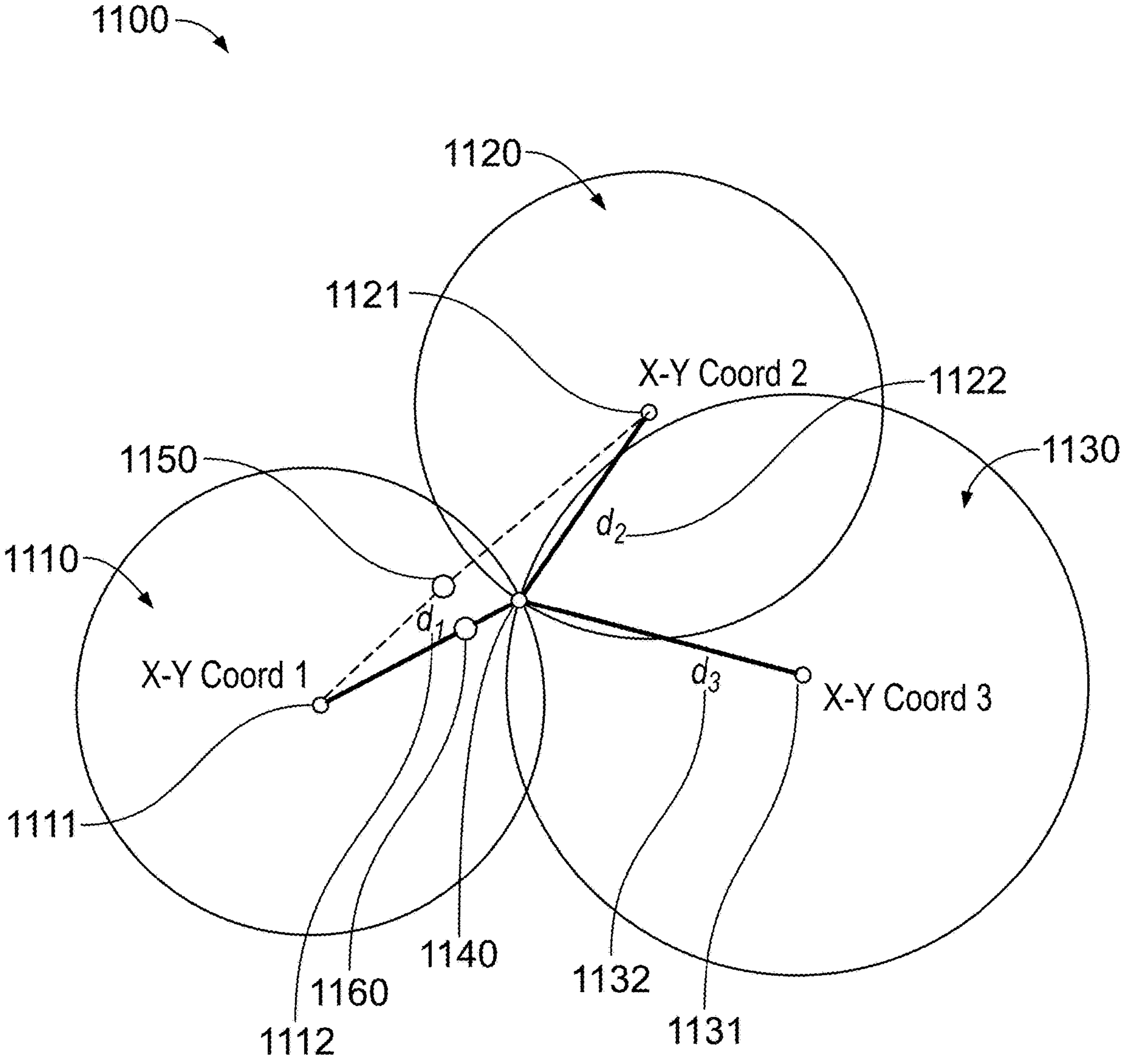
FIG. 11 illustrates example positions of a subset of passive RFID transponders, and their respective centers and distances used for determining a position of the medical device simulator relative to the at least one human body portion by generating a weighted RFID signal centroid position, in accordance with various embodiments herein.

FIG. 11 illustrates example positions (e.g., positions 1110, 1120, and 1130) of a subset 1100 of passive RFID transponders, and their respective centers (e.g., centers 1111, 1121, and 1131, respectively) and distances (e.g., distances 1112, 1122, and 1132, respectively) used for determining the position of the medical device simulator relative to the at least one human body portion by generating a weighted RFID signal centroid position (e.g., weighted RFID signal centroid position 1150 or weighted RFID signal centroid position 1160), in accordance with various embodiments herein.

In various aspects herein, a weighted RFID signal centroid position can be generated or determined by calculating a weighted average based on received signal strength indications (RSSI), where RSSI values are used to weight or otherwise assign more importance to a position reported by a given passive RFID transponder which has a stronger RSSI signal. Generally, stronger RFID signals are reported by passive RFID transponders that are closer to the RFID reader of the medical device simulator. The below formula may be used to generate a weighted RFID signal centroid position, as described herein:

$$(\bar{x},\bar{y}) = \sum_{i=1}^{n} x_i \frac{RSSI_i}{\sum_{j=1}^{n} RSSI_j}, \sum_{i=1}^{n} y_i \frac{RSSI_i}{\sum_{j=1}^{n} RSSI_j} \quad (1)$$

In formula (1), as shown above, $\bar{x}$ is the x-value of the weighted RFID signal centroid position, and $\bar{y}$ is the y-value of the weighted RFID signal centroid position. The $\bar{x}$ value is calculated by taking the sum of the respective RSSI x-values (1-n) of a group of passive RFID transponders. The $\bar{y}$ value is calculated by taking the sum of the respective RSSI y-values (1-n) of a group of passive RFID transponders.

When compared to a conventional centroid algorithm, the weighted RFID signal centroid position yields a more linear relationship between a simulated position and an actual position of the RFID reader of a medical device simulator. This is because the weighted RFID signal centroid position, when compared to a conventional centroid algorithm, yields less error in distance or proximity when measuring between a simulated position and an actual position of the RFID reader of a medical device simulator. However, it is to be understood that a conventional centroid position may nonetheless be used with the systems and methods herein.

With reference to FIG. 11, in one example, a centroid position, such as a weighted RFID signal centroid position, may be generated by calculating distance and/or RSSI values between two passive RFID transponders. This is shown in the example of FIG. 11 by weighted RFID signal centroid position 1150. In the example, for determining weighted RFID signal centroid position 1150, the determining the position of the medical device simulator relative to the at least one human body portion comprises determining, from the RFID signal data (e.g., the RSSI data) and the X-Y coordinate data, a first X-position, a first Y-position, and a first signal strength of a first RFID transponder (e.g., a first RFID transponder located at position 1110) of the plurality of passive RFID transponders. The first X-position and first Y-position correspond to X-Y coordinate 1 1111 at position 1110. The first signal strength (e.g., one or more RSSI values) corresponds to a first proximity of the medical device simulator to the first RFID transponder.

Similarly, the determining the position of the medical device simulator relative to the at least one human body portion further comprises determining, from the RFID signal data (e.g., the RSSI data) and the X-Y coordinate data, a second X-position, a second Y-position, and a second signal strength of a second RFID transponder (e.g., a second RFID transponder located at position 1120) of the plurality of passive RFID transponders. The second X-position and second Y-position correspond to X-Y coordinate 2 1121 at position 1120. The second signal strength (e.g., one or more RSSI values) corresponds to a second proximity of the medical device simulator to the second RFID transponder.

Analyzing the RFID signal data and the X-Y coordinate data to determine the position of the medical device simulator (or otherwise RFID reader) can comprise generating a weighted RFID signal centroid position (e.g., weighted RFID signal centroid position 1150) based on a weighting of the first signal strength compared to the second signal strength. In some cases, the weighted RFID signal centroid position can be generated such that its position value is nearer to the first RFID transponder when the first signal strength is greater than the second signal strength. In other cases, the weighted RFID signal centroid position can be generated such that its position value is nearer to the second RFID transponder when the second signal strength is greater than the first signal strength. Still further, in some cases the weighted RFID signal centroid position can be generate as equidistant from the first RFID transponder and the second RFID transponder when the first signal strength is equal to the second signal strength.

In the example of FIG. 11, a distance $d_1$ 1112 separates X-Y coordinate 1 1111 of position 1110 and X-Y coordinate 2 1121 of position 1120. The weighted RFID signal centroid position 1150 is positioned nearer the first RFID transponder (e.g., the first RFID transponder located at position 1110) than the second RFID transponder (e.g., a second RFID transponder located at position 1120). The weighted RFID signal centroid position 1150 indicates a detected or otherwise simulated position that the medical device simulator is currently located at with respect to each of the first RFID transponder and the second RFID transponder.

With further reference to FIG. 11, in a second example, a centroid position, such as a weighted RFID signal centroid position, may be generated by calculating distance and/or RSSI values among three passive RFID transponders. This is shown in the example of FIG. 11 by weighted RFID signal centroid position 1160. This second example comprises an example of determining a weighted RFID signal centroid position among three passive RFID transponders. However, it is to be understand that the same algorithm could be used to determine the position among four or more passive RFID transponders.

In the example, for determining weighted RFID signal centroid position 1160, the determining the position of the medical device simulator relative to the at least one human body portion comprises determining, from the RFID signal data (e.g., the RSSI data) and the X-Y coordinate data, a first X-position, a first Y-position, and a first signal strength of a first RFID transponder (e.g., a first RFID transponder located at position 1110) of the plurality of passive RFID transponders. The first X-position and first Y-position correspond to X-Y coordinate 1 1111 at position 1110. The first signal strength (e.g., one or more RSSI values) corresponds to a first proximity of the medical device simulator to the first RFID transponder.

Similarly, the determining of the position of the medical device simulator relative to the at least one human body portion further comprises determining, from the RFID signal data (e.g., the RSSI data) and the X-Y coordinate data, a second X-position, a second Y-position, and a second signal strength of a second RFID transponder (e.g., a second RFID transponder located at position 1120) of the plurality of passive RFID transponders. The second X-position and second Y-position correspond to X-Y coordinate 2 1121 at position 1120. The second signal strength (e.g., one or more RSSI values) corresponds to a second proximity of the medical device simulator to the second RFID transponder.

Similarly, the determining the position of the medical device simulator relative to the at least one human body portion further comprises determining, from the RFID signal data (e.g., the RSSI data) and the X-Y coordinate data, a third X-position, a third Y-position, and a third signal strength of a third RFID transponder (e.g., a third RFID transponder located at position 1130) of the plurality of passive RFID transponders. The third X-position and third Y-position correspond to X-Y coordinate 3 1123 at position 1130. The third signal strength (e.g., one or more RSSI values) corresponds to a third proximity of the medical device simulator to the third RFID transponder.

Analyzing the RFID signal data and the X-Y coordinate data to determine the position of the medical device simulator (or otherwise RFID reader) can comprise generating a weighted RFID signal centroid position (e.g., weighted RFID signal centroid position 1160) based on a weighting of each of the first signal, the second signal strength and the third signal strength. In such cases, the weighted centroid position can be adjusted toward or otherwise calculated based on each of the first passive RFID transponder, the second passive RFID transponder, and/or the third passive RFID transponder proportionally based on a weighted magnitude of each of the first signal strength, second signal strength, and/or third signal strength, respectively.

It should be noted that the systems and methods described herein are not limited to only two or three RFID transponders. Technically, the systems and methods herein can use and process tens or hundreds of RFID transponders. For example, in one aspect, one to fourteen tags can be used to compute an X-Y position.

In the example of FIG. 11, each of the passive RFID transponders at positions 1110, 1120, and 1130 share non-weighted centroid 1140. Each of these passive RFID transponders have respective distances $d_1$ 1112, $d_2$ 1122, and $d_3$ 1132 from the non-weighted centroid 1140. The weighted RFID signal centroid position 1160 is positioned nearer the first RFID transponder (e.g., the first RFID transponder located at position 1110) than either of the second RFID transponder (e.g., a second RFID transponder located at position 1120) or the third RFID transponder (e.g., a third RFID transponder located at position 1130). The weighted RFID signal centroid position 1160 provides a detected or otherwise simulated position that the medical device simulator is currently located at with respect to each of the first RFID transponder, the second RFID transponder, and the third RFID transponder.

Each of the circular positions 1110, 1120, and 1130 of FIG. 11 corresponds to a location of a passive RFID transponder of a given RFID matrix membrane, where the center of the circle circular positions 1110, 1120, and 1130 maps to the center of a respective passive RFID transponder. In some aspects, each circle area of the circular positions 1110, 1120, and 1130 may represent a signal range or otherwise effective signal range of each passive RFID transponder, such that an RFID reader would be able to detect any one or more of the passive RFID transponders in the subset 1100 when the RFID reader of the medical device simulator passes over the RFID matrix membrane.

In some aspects, one or more of the passive RFID transponders can be adapted to compensate for interferences caused by the passive RFID transponders due to their proximity to one another. In such aspects, RF power can be adjusted up or down such that communication is established to a selected quantity or otherwise subset of transponders.

In such aspect, each passive RFID transponder can be programmed or controlled individually to balance system accuracy and latency. For example, establishing communication to several transponders reduces the latency of the system. The following principle can be implemented to automatically generate a selected balance between accuracy and latency: (a) improving system latency by reducing RF power to reduce the number of transponders responding; and (b) improving position precision by increasing RF power to increase the number of transponders responding.

A balance between system latency and position precision can be determined for each use application (e.g., heart monitoring or ankle analysis) and can be based on the number of passive RFID transponders, their positions or arrangement within the RFID matrix membrane, and/or their positioning and/or proximity to human body portion being simulated or otherwise analyzed. The following algorithm can be applied to determine adjust between system latency and position precision: (1) start with full RF power; (2) measure time required to perform transponder latency; (3) is the time above a given latency target value? (3a) If yes, then is the transponder latency greater than a given minimum latency? If yes, then reduce the RF power; otherwise return to step (2) and reimplement; and (3b) If no, then is the RF power at full capacity? If no, then increase the RF power; otherwise return to step (2) and reimplement. In this way, a balance between system latency and position precision can be determined for a specific RFID matrix membrane for a specific use application (e.g., heart monitoring or ankle analysis).

Still further, interference can be further be reduced by the matrix or otherwise pattern or layout of passive RFID transponders in the RFID matrix membrane, where such matrix can be optimized in various shapes (e.g., hexagonal) to meet accuracy and latency specifications when the passive RFID transponders are read by the RFID reader. The membrane holding the RFID transponders, and the RFID transponders themselves, can withstand mechanical forces induced during operation and use, such as Cardiopulmonary Resuscitation (CPR) maneuvers.

Figure 12:
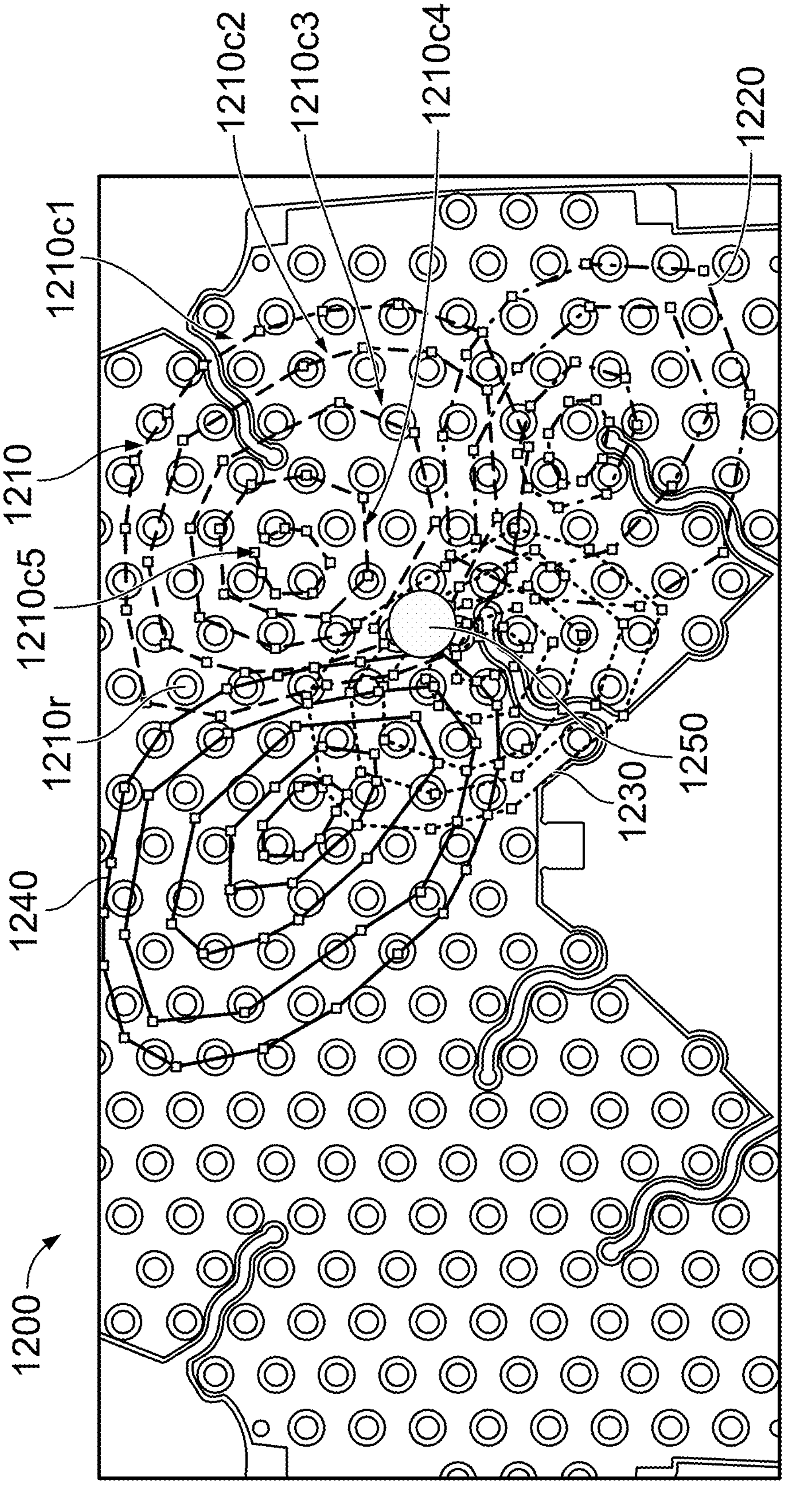
FIG. 12 illustrates an example X-Y coordinate plane corresponding to a surface of the RFID matrix membrane and one or more zones defined within the X-Y coordinate plane, in accordance with various embodiments herein.

FIG. 12 illustrates an example X-Y coordinate plane 1200 corresponding to a surface of a RFID matrix membrane (e.g., RFID matrix membrane 200) and one or more zones (e.g., zone 1210, zone 1220, zone 1230, and/or 1240) defined within the X-Y coordinate plane, in accordance with various embodiments herein. As shown in the example of FIG. 12 four zones are illustrated by way of non-limiting example. It is to be understood, however, that additional or fewer zones may be defined the X-Y coordinate plane.

In the example of FIG. 12, X-Y coordinate plane 1200 corresponds to a surface of the RFID matrix membrane 200. The X-Y coordinate plane is mapped relative to the RFID matrix membrane 200 based on respective X-Y coordinates of the plurality of passive RFID transponders (e.g., one such passive RFID transponder being passive RFID transponder 1210*r*, although it should be understood that X-Y coordinate plane 1200 includes a plurality of passive RFID transponders, each representative of a physical passive RFID transponder positioned in RFID matrix membrane 200, for example, as described herein).

Still further, in the example of FIG. 12, each of the four zones (e.g., zone 1210, zone 1220, zone 1230, and/or 1240) are also defined with multiple contouring subsections. For example, zone 1210 is broken in into first contour subsection 1210*c*1, second contour subsection 1210*c*2, third contour subsection 1210*c*3, fourth contour subsection 1210*c*4, and fifth contour subsection 1210*c*5. It is to be understood, however, that these are non-limiting examples of contouring subsections, and that additional or fewer contouring subsections may be defined. As shown, each of contouring subsections define specific areas of zone 1210. In various aspects, each specific area of the contouring subsections may represent relative positions or magnitudes of values for the given zone. For example, zone 1210 may represent a zone of the heart. Another non-limiting example includes a zone of a lung. Each zone, such as zone 1210, may have a zone type, e.g., heart zone type, to define, classify, or otherwise configure the zone's configuration. A zone type may define a variable, such as sound volume or graphic heatmap intensity, for modulating feedback indications. For example, if a given zone (e.g., zone 1210) is classified as a heart zone type, then moving a medical device simulator (e.g., a stethoscope) over the zone (e.g., zone 1210) would cause an audio file to be triggered or loaded to play a heart sound and/or cause a graphic (e.g., a heatmap or realistic simulated heart) to be displayed or updated. The heart sound could be simulated to sound like that of a real heart in the given zone, or otherwise position relative to the medical device simulator (e.g., position 1250 located in second contour subsection 1210*c*2 of zone 1210). Similarly, the graphic could be simulated to be rendered like that of a real heart, or a graphical depiction or indication thereof, in the given zone, or otherwise position relative to the medical device simulator.

Still further each contour subsection of zone 1210 may relate to a reference location of a given human organ or otherwise body portion, where movement of the medical device simulator nearer or further from the reference location causes the variable (e.g., sound variable) to be changed or modulated with a given magnitude (e.g., sound volume) based on proximity of the medical device simulator. For example, in the example of FIG. 12, fifth contour subsection 1210*c*5 may define a reference location of valve or otherwise portion of the heart. A magnitude (e.g., sound volume) is greatest at the reference location, e.g., at fifth contour subsection 1210*c*5. As the medical device simulator (e.g., simulated stethoscope) moves through each of the remaining contour subsections (e.g., from fourth contour subsection 1210*c*4, third contour subsection 1210*c*3, second contour subsection 1210*c*2 to first contour subsection 1210*c*1) the magnitude (e.g., sound volume) can be modulated (in this case attenuated to decrease the sound volume) discretely per zone or, alternatively, continuously. Moving the medical device simulator (e.g., simulated stethoscope) back towards fifth contour subsection 1210*c*5 can do the opposite, e.g., increase (amplify) the magnitude of the variable (e.g., sound volume). Such operations are performed by RFID reader of the medical device simulator reading the RFID signal data and X-Y coordinate data, as described herein, and providing such data to the app executing on the computing device (e.g., external computing device 500).

It is to be understood that each of zones 1220, 1230, and 1240 may also include contour subsections, for example, as shown for FIG. 12, and that the description for the contour subsections for zone 1210 applies the same or similarly for each of the respective contour subsections of zones 1220, 1230, and 1240.

Figure 13:
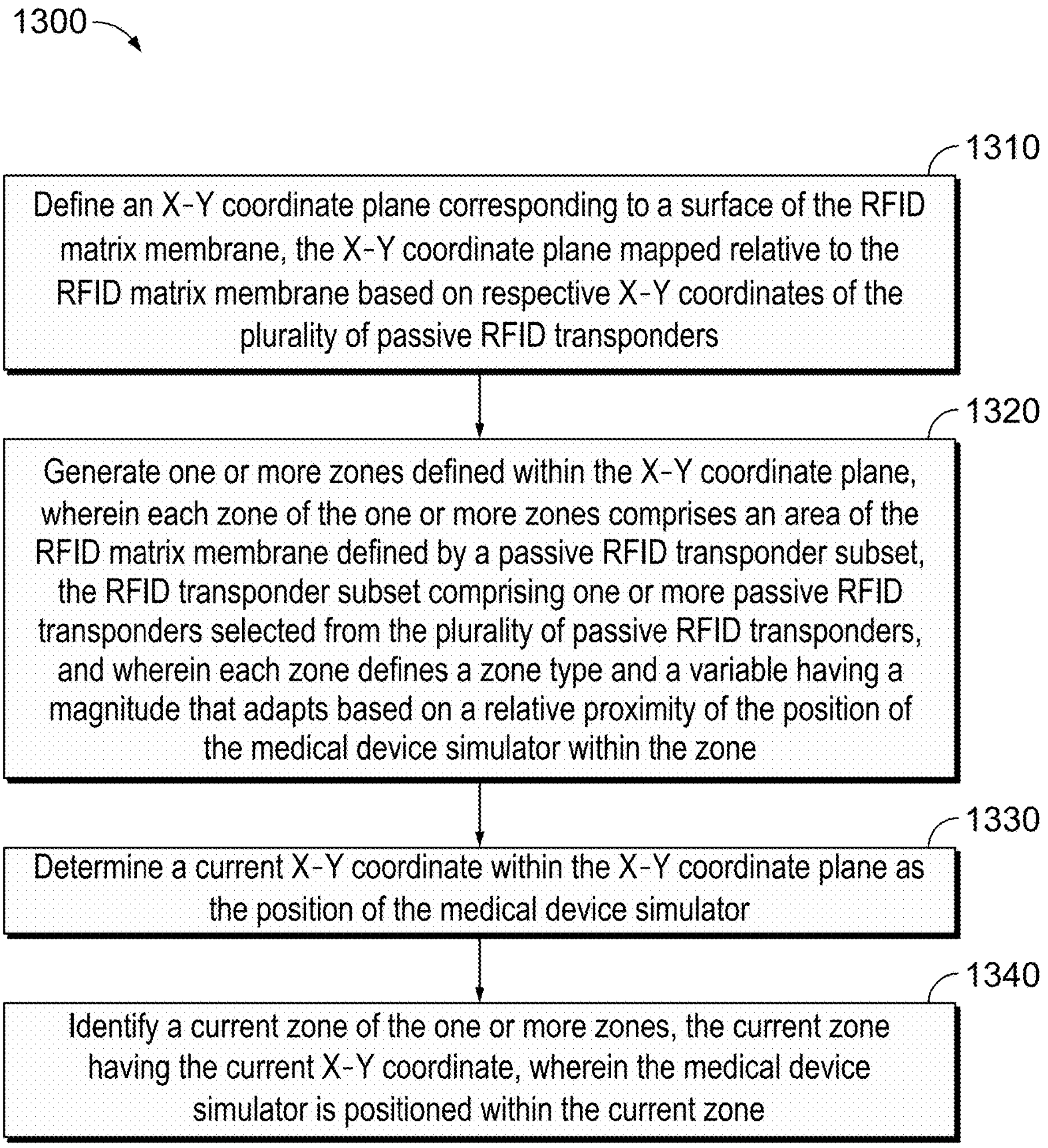
FIG. 13 illustrates an example method for defining the X-Y coordinate plane corresponding to the surface of the RFID matrix membrane and the one or more zones defined within the X-Y coordinate plane of FIG. 12, in accordance with various embodiments herein.

FIG. 13 illustrates an example method 1300 for defining an X-Y coordinate plane (e.g., X-Y coordinate plane 1200) corresponding to the surface of the RFID matrix membrane (e.g., RFID matrix membrane 200) and the one or more zones (e.g., zone 1210, zone 1220, zone 1230, and/or 1240) defined within the X-Y coordinate plane, for example, of FIG. 12, in accordance with various embodiments herein. As shown for FIG. 13, method 1300, a processor (e.g., a processor of external computing device 500) may execute computing instructions (e.g., computing instructions of the app stored in memory) to execute or otherwise implement method 1300. At block 1310, method 1300 comprises defining an X-Y coordinate plane (e.g., X-Y coordinate plane 1200) corresponding to a surface of the RFID matrix membrane (e.g., RFID matrix membrane 200). The X-Y coordinate plane is mapped relative to the RFID matrix membrane based on respective X-Y coordinates of the plurality of passive RFID transponders (e.g., passive RFID transponder 1210*r* and others as shown or described in any of FIGS. 1-4, FIG. 12, and/or elsewhere herein).

With further reference to FIG. 13, block 1310, method 1300 comprises generating one or more zones (e.g., zone 1210, zone 1220, zone 1230, and/or 1240) defined within the X-Y coordinate plane. Each zone of the one or more zones may comprise an area of the RFID matrix membrane (e.g., RFID matrix membrane 200) defined by a passive RFID transponder subset. The area may comprise, for example, a contouring subsection (e.g., first contour subsection 1210*c*1, second contour subsection 1210*c*2, third contour subsection 1210*c*3, fourth contour subsection 1210*c*4, and/or fifth contour subsection 1210*c*5). The RFID transponder subset may comprise one or more passive RFID transponders selected from the plurality of passive RFID transponders (e.g., passive RFID transponder 1210*r*).

In some aspects, the one or more zones may be defined automatically by the one or more processors, e.g., by selecting zones based on positions of specific passive RFID transponders. Additionally, or alternatively, a user may also select or determine such zones from a user interface. In such aspects, generating the one or more zones of the X-Y coordinate plane may comprise displaying on a display screen a graphical representation of the RFID matrix membrane (e.g., RFID matrix membrane 200 as shown in FIG. 11). The graphical representation of the RFID matrix membrane may graphically depict locations of the plurality of passive RFID transponders (e.g., passive RFID transponder 1210*r*). The processor of external computing device may then receive one or more user selections marking one or more graphical contours (e.g., first contour subsection 1210*c*1, second contour subsection 1210*c*2, third contour subsection 1210*c*3, fourth contour subsection 1210*c*4, and/or fifth contour subsection 1210*c*5).) overlayed on the graphical representation of the RFID matrix membrane. Each of the one or more graphical contours may define the one or more zones (e.g., zone 1210, zone 1220, zone 1230, and/or 1240), for example as described herein.

In various aspects, each zone (e.g., zone 1210, zone 1220, zone 1230, and/or 1240) may define a zone type (e.g., heart zone) and a variable (e.g., sound) having a magnitude (e.g., sound volume of across a variable scale of 1, 2, 3, to 10, or, alternatively, continuously) that adapts based on a relative proximity of the position of the medical device simulator (e.g., medical device simulator 300) within the zone. For example, in simulation or training involving auscultation, a medical student may search for and locate an adequate auscultation area. The RFID reader of the medical device simulator may read signal data and X-Y coordinate data and provide such data to the app, where the app would analyze the data to detect the position of the medical device simulator is at zone 1210, which could be at position 1250 as shown in FIG. 12. The app could then initiate or play and audio file that would include sounds associated with a specific pathology (e.g., heart murmur). In various aspects, the variable may define sound volume (e.g., a magnitude) of human organ or a medical condition. The magnitude of the sound volume can adapts based on the relative proximity of the position of the medical device simulator within the current zone. For example, different zones may be defined for sound mapping for auscultation training. Movement of the medical device simulator may cause the processor to select and playback different audio file(s) (.wav files) for different medical conditions (e.g., normal heart, heart murmur, normal breathing compared to wheezing, etc.) for different zones. The processor can modulate the playback (e.g., change the sound) based on proximity of the zone center. Zones can also represent different organs (e.g., heart), where audio file may simulate a heart medical condition (e.g., murmuring), based on a type of the zone (e.g., heart zone).

More generally, as the objective of simulation is to train students, who may not be fully versed in the use of the medical instrument, the student may hover the medical device simulator (e.g., simulated stethoscope) over a full simulated torso. The student may then search for an area of interest (e.g., a mitral valve), randomly at first, and is likely to auscultate over areas which may be anatomically irrelevant. The simulated heart sound will be at maximum volume (e.g., 100% volume) when the stethoscope is closest to the center of the target (e.g., at fifth contour subsection 1210*c*5), and continuously fade out (or otherwise attenuate) as the stethoscope moves away.

In this way, the RFID matrix membrane 200 allows for increased fidelity for detecting specific areas of the human body or simulation portion thereof. For example, one or more zones may be defined as comprising the tricuspid valve of the heart. In such aspect, moving the medical device simulator (e.g., a simulated stethoscope) over a chest area, with the RFID matrix membrane was placed or otherwise situated or mapped, would cause the one or more processors to determine the medical device simulator position at the tricuspid valve. A feedback indication such as a sound played from a sound file could then be output or otherwise played back at a magnitude indicative of a real-world volume of the tricuspid valve's position relative to the medical device simulator.

With further reference to FIG. 13, block 1310, method 1300 comprises determining a current X-Y coordinate within the X-Y coordinate plane as the position of the medical device simulator. A current X-Y coordinate may compromise position 1250 as shown for FIG. 12.

With further reference to FIG. 13, block 1310, method 1300 comprises identifying a current zone of the one or more zones. The current zone would include the current X-Y coordinate wherein the medical device simulator is positioned within the current zone. For example, in FIG. 12, a current zone would be zone 1210 because the medical device simulator is at position 1250 (defining the current X-Y coordinate) within that zone (e.g., or, more precisely, at second contour subsection 1210*c*2 within zone 1210).

In some aspects, the current X-Y coordinate can be positioned within at least two of the one or more zones that overlap within the X-Y coordinate plane. In such aspects, the current zone is selected as the zone having the variable with a greatest magnitude. For example, as shown for FIG. 12, the X-Y coordinate at position 1250 (e.g., the position of the medical device simulator) is within zones 1210 and 1230, which overlap. In the example, zone 1210 may have a heart zone type and zone 1230 may have a lung zone type. If zone 1210 with the heart zone type has a highest sound volume magnitude compared to zone 1230 having the lung zone type, then the processor may select and play only a heart sound file (e.g., a.wav file).

Additionally, or alternatively, sounds can be mixed when the medical device simulator is positioned over multiple zones. In such aspects, the current X-Y coordinate (e.g., at position 1250)) may be positioned within the current zone (e.g., zone 1210) and a second zone (e.g., zone 1230) of the one or more zones. The current zone (zone 1210 and the second zone (e.g., zone 1230) can overlap within the X-Y coordinate plane (e.g., X-Y coordinate plane 1200). A second magnitude of a second sound volume (e.g., lung sound) adapts based on a second relative proximity of the position of the medical device simulator within the second zone. In this way, the sounds of the two zones (e.g., zone 1210 and zone 1230) can be mixed where each is played back as respective feedback indications based on relative magnitude of each zone (e.g., lung and heart) determined by the proximity of the medical device simulator within or to each respective zone.

In should be noted that anatomically, the systems and methods herein can comprise more than two zones. For example, in one aspect, up three zones may be supported (e.g., the position of the Tricuspid, Mitral valves and left lung).

Figure 14:
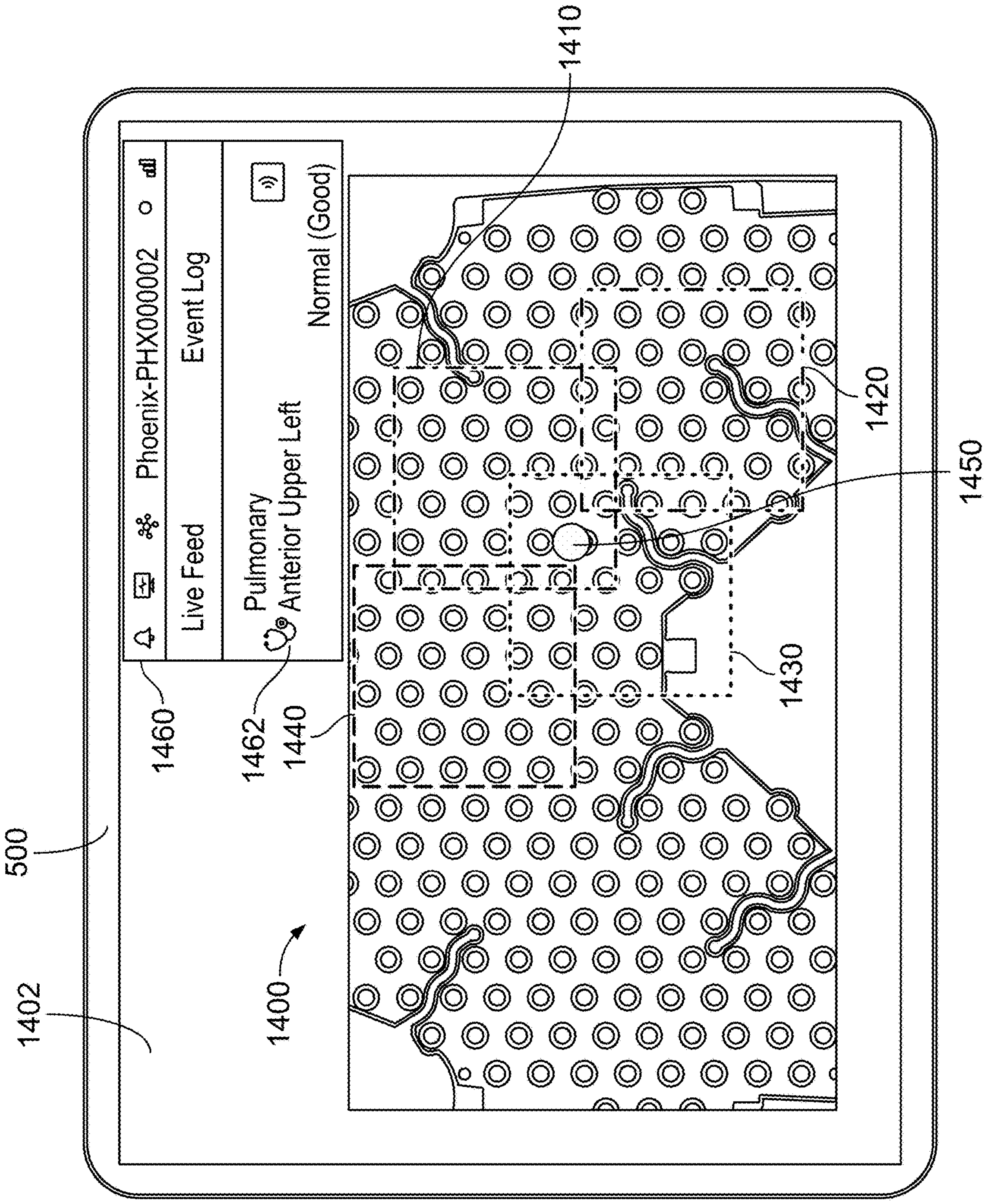
FIG. 14 illustrates an example of one or more heatmaps corresponding to the one or more zones of the RFID matrix membrane as described for FIGS. 12 and 13, and in accordance with various embodiments herein.

FIG. 14 illustrates an example of one or more heatmaps (e.g., heatmap 1410, heatmap 1420, heatmap 1430, and/or heatmap 1440) corresponding to the one or more zones (e.g., zone 1210, zone 1220, zone 1230, and/or 1240), respectively, of the RFID matrix membrane (e.g., RFID matrix membrane 200) as described for FIGS. 12 and 13, or elsewhere herein, and in accordance with various embodiments herein. The example of FIG. 14 shows X-Y coordinate plane 1400 generated on an example user interface 1402 as rendered on a display screen of a computing device (e.g., external computing device 500). X-Y coordinate plane 1400 may the same, or similar to X-Y coordinate plane 1200 of FIG. 12. For example, as shown for FIG. 14, heatmap 1410 corresponds to zone 1210, heatmap 1420 corresponds to zone 1220, heatmap 1430 corresponds to zone 1230, and heatmap 1440 corresponds to zone 1240. Heatmaps may, in other aspects, have additional and/or fewer mapping with respect to zones, such that one heat map may cover many zones or vice versa.

Each of the heatmaps may include respective graphics indicating a proximity of the position of the medical device simulator. For example, the position of the medical device simulator may be at position 1450, which may correspond to position 1250 of FIG. 12. For example, each of the one or more graphical contours of FIG. 12 may be graphically displayed on a display device (e.g., external computing device 500) as corresponding one or more heatmaps. That is the contours of each of zones (e.g., zone 1210, zone 1220, zone 1230, and/or 1240) may be displayed. The color intensity of a given heatmap of the one or more heatmaps may represent a current zone as updated based on the relative proximity of the position of the medical device simulator within the current zone. For example, as shown in FIG. 14, the medical device simulator may be in zone 1210 (as described for FIG. 12), and heatmap 1410 may include a red or orange color intensity closest to position 1450. Other positions within the remaining heatmaps (e.g., heatmap 1420, heatmap 1430, and/or heatmap 1440) will have lesser degrees or faded values or red, orange, or yellow. Positions further away from position 1450 may be rendered in cooler colors, such as blue, purple, or green.

As shown in the example of FIG. 14, user interface 1402 may be implemented or rendered via an application (app) executing on external computing device 500. User interface 1402 may be implemented or rendered via a native app executing on external computing device 500. In the example of FIG. 14, external computing device 500 is illustrated as an APPLE iPad that implements the APPLE IOS operating system and that has a display screen. External computing device 500 may execute one or more native applications (apps) on its operating system, including, for example, the app as described herein. Such native apps may be implemented or coded (e.g., as computing instructions) in a computing language (e.g., SWIFT) executable by the user computing device operating system (e.g., APPLE iOS) by the processor of external computing device 500.

Additionally, or alternatively, user interface 1402 may be implemented or rendered via a web interface, such as via a web browser application, e.g., Safari and/or Google Chrome app(s), or other such web browser or the like.

As shown, the user interface 1402 may include status information box 1460, which may output a live feed including a description 1462 including a test or zone type (e.g., pulmonary) and position (e.g., "anterior upper left") of the medical device similar as currently detected by the app reading the passive RFID transponders.

Further, as described herein various feedback indications may be output by the computing device based on analysis of the RFID signal data and the X-Y coordinate data and the position of the medical device simulator relative to the at least one human body portion as determined therefrom. For example, with further reference to FIG. 14, a feedback indication can be any one or more an audible indication output by a speaker (e.g., a speaker of external computing device 500) or a visual indication output to a display screen (e.g., a display screen of external computing device 500). Additionally, or alternatively, a speaker can be a speaker positioned within, or as part of, the medical device simulator.

In one example, a visual indication may one or more graphics depicting a graphical area of the body representative of the human body portion (e.g., a chest area as shown in FIGS. 12 and 14) and a location marker indicating the position (e.g., position 1250 and 1450, respectively) of the medical device simulator relative to the graphical area of the body.

In a still further example, a visual indication may comprise a graphic or text indicating a positioning score having a value corresponding to accurate placement of the medical device simulator relative to the reference position. For example, a score may be rendered for position 1250 of FIG. 12 based on a reference position located at and fifth contour subsection 1210*c*5, e.g., a lung or a heart area. In such aspects, the app may determine the zone that the simulated stethoscope is located within (e.g. upper left lung, aortic valve, etc.) and can generate a score detailing how well placed the stethoscope is within that region. For example, a score may be generated relative to a reference location (e.g., fifth contour subsection 1210*c*5) of a given zone (e.g., zone 2010). For example, a score of "0" may be rendered when the medical device similar is completely outside of zone 1210. The score may be increased as the medical device similar moves toward fifth contour subsection 1210*c*5, e.g., a value of "100" for when the medical device simulator moves is positioned over fifth contour subsection 1210*c*5, and values "20," "40," "60," and "80" for when medical device simulator is positioned over contour subsection 1210*c*2, contour subsection 1210*c*3, contour subsection 1210*c*4, respectively. It should be understood, however, that different scores may also be used, e.g., scores weighted on continuous positions instead of zones or contours.

In a still further example, an audible indication may comprise one or more sounds output based on the position of the medical device simulator relative to one or more groups of passive RFID transponders selected from the plurality of passive RFID transponders. The sound may be the sound of a heart and/or lung based on the zone type, and where the sound is that of a prerecorded heart and/or lung sound saved in a sound or music file (e.g., wav or .mp3, etc.).

Feedback indicators are output to simulate real world human body organs or portions. For example, for several positions of a simulated medical device, there is overlap between the heart and lung regions (like a real patient) so a simulated stethoscope (e.g., medical device simulator) could be in multiple regions as the same time. Information (e.g., graphics or text) as output by the app can be displayed on the display screen that a student and/or instructor can use to see and/or control for purposes of training. For example, users may be informed that that an auscultation is happening, what area or zone is being auscultated, the type of sound (e.g. normal, murmur, etc.), the quality of sound that the user (e.g., a medical student) is hearing (e.g., good or faint based on the position or score of the medical device simulator) and the ability to play the same sound that the student is hearing.

Example Sound Mapping Implementation

In one implementation, heatmaps may be defined for one or more zones. Several (possibly overlapping) zones can be defined within an area with a common X-Y coordinate plane. Each zone can define a 2-dimensional distribution of a continuous variable, which can be sound volume. Specifically for this example, each zone can also define its type (e.g., a zone type) from within a set of types (e.g., heart, lung, etc.). When the app receives an update of the X-Y coordinate data from the app, e.g., executing a localization module or otherwise computing instructions, the app can determine zones (e.g., zone 1210, zone 1230, etc.) that the current X-Y coordinate is located within. Specifically for this example, multiple active zones (e.g., 2 zones) of different types may be identified (e.g., heart and lung) to cause the app to mix two sounds for the playback output (e.g., heart and lung sound output). Additionally, or alternatively, if multiple zones spatially overlap, the app can select the zone with the maximum volume.

In the example implementation, a method is implemented (e.g., method 1300) by the app to define the zones. Once the zones are defined, the app can implement a further method (e.g., method 1300) to process the zones in real-time to provide feedback indications (e.g., graphic and/or sound output) regarding the position of the medical device simulator and its proximity to the relevant zones.

As described herein, graphical contours may be defined by a user that create zones within an X-Y coordinate plane (e.g., as shown and described for FIG. 12). The zones can be translated into a set of heatmaps, one for each of the zones (e.g., as shown and described for FIG. 14). In one aspect, the process of creating the heatmaps is as follows. For each zone a bounding box is created based on min/max values of an outside contour. Each bounding box is spatially digitized with a grid of a selected resolution (resolution might be different for each zone). The values of grid nodes are computed as interpolated values based on the defined contours. The app can then determine the following information for each of the zones and stores this information as a file. An example of one file, and the related information, is as follows:

```
<Zone ID>,<Zone name>
<ZoneType>
<OffsetX>, <OffsetY>, <LengthX>, <LengthY>, <NumPointsX>,
<NumPointsY>
<ResolutionX>, <ResolutionY>
<val_11, val_12, ... val_1N>
...
<val_21, val_22, ... val_MN>
```

The values in the example file are as follows:

<Zone ID>: integer starting from 1 and uniquely identifying a sound zone.

<ZoneType>: 0=undefined; 1=heartbeat; 2=respiration; 3=bowels; 4=test.

<OffsetX>, <OffsetY>: offset of the zone bounding box origin within the coordinate system of the associated area.

<LengthX>, <LengthY>: zone bounding box dimensions in mm.

<NumPointsX>, <NumPointsY>: number of values in the sound intensity matrix along X and Y dimensions respectively.

<ResolutionX>, <ResolutionY>: X and Y grid resolution in mm.

<val_XY>: matrix defining sound intensity values on the grid nodes of the zone.

The file may then be stored on in computer memory as described herein.

The solution allows adjustment (e.g., by a user or programmatically) of the resolution of the generated grids suitable for specific application and to optimize memory usage for running on the target device.

Once the file is stored, it can be accessed by the app, where the app can implement the following algorithm, e.g., as described for example for method 1300. Step 1 comprises identifying zones at the current location as follows: for each zone associated with the area: (1) check if X, Y is within the bounding box of the zone; (1a) If yes: convert X, Y to the coordinates (x, y) within the grid; (1b) then find interpolated value of the sound volume based on the grid node values and grid resolution. Additional steps may be implemented improve performance. For example, active zones may be selected from all the zones at the current location, where one zone is selected, e.g., one of each type with highest volume. Additionally, or alternatively, currently active playback zones may be updated with the new set of zones based on the new set of active zones.

Aspects of the Disclosure Regarding an RFID Matrix Membrane and Position Detection Systems Having an RFID Matrix Membrane The following aspects are provided as examples in accordance with the disclosure herein and are not intended to limit the scope of the disclosure.

1. A radio-frequency identification (RFID) matrix membrane, comprising: a membrane configured to be positioned proximate to a human body portion; and a plurality of passive RFID transponders affixed to the membrane and arranged in a matrix; wherein each of the plurality of passive RFID transponders is positioned such that a center of each of the plurality of passive RFID transponders is equidistant from the center of each adjacent passive RFID transponder with the membrane in a first state; and each of the plurality of passive RFID transponders is configured to provide a respective signal strength and an X-Y coordinate detectable by an RFID reader of a medical device simulator for determining a position of the medical device simulator relative to the plurality of passive RFID transponders.

2. The RFID matrix membrane of example 1, wherein the membrane is a flexible membrane.

3. The RFID matrix membrane of any one of examples 1-2, wherein the human body portion is an artificial human body portion.

4. The RFID matrix membrane of any one of examples 1-3, wherein: the membrane comprises a plurality of pockets formed in the membrane; and each of the plurality of passive RFID transponders is at least partially positioned in a corresponding one of the plurality of pockets.

5. The RFID matrix membrane of example 4, wherein at least a portion of each of the plurality of passive RFID transponders is removably inserted into a corresponding pocket.

6. The RFID matrix membrane of any one of examples 1-5, wherein the plurality of passive RFID transponders are arranged in aligned columns and rows, forming a square pattern.

7. The RFID matrix membrane of any one of examples 1-5, wherein the plurality of passive RFID transponders are arranged in aligned columns and rows, forming a diamond pattern.

8. The RFID matrix membrane of any one of examples 1-5, wherein the plurality of passive RFID transponders are arranged in a hexagonal pattern.

9. The RFID matrix membrane of any one of examples 1-8, wherein the centers of each of the plurality of passive RFID transponders is spaced between 3 mm and 30 mm from the center of each adjacent passive RFID transponder.

10. The RFID matrix membrane of example 9, wherein the centers of each of the plurality of passive RFID transponders is spaced 18 mm from the center of each adjacent passive RFID transponder.

11. A position detection system, comprising: an RFID matrix membrane, comprising: a plurality of passive RFID transponders; and a membrane configured to be positioned proximate to a human body portion and including a plurality of retention means arranged in a matrix for affixing each of the plurality of passive RFID transponders to the membrane, wherein each of the plurality of passive RFID transponders is affixed to the membrane via one of the plurality of retention means such that a center of each of the plurality of passive RFID transponders is equidistant from the center of each adjacent passive RFID transponder with the membrane in a first state; and a medical device simulator comprising a RFID reader and configured to determine a position of the medical device simulator relative to the plurality of passive RFID transponders.

12. The position detection system of example 11, wherein the membrane is a flexible membrane.

13. The position detection system of any one of examples 11-12, wherein the human body portion is an artificial human body portion.

14. The position detection system of any one of examples 11-13, wherein: the plurality of retention means comprises a plurality of pockets formed in the membrane; and each of the plurality of passive RFID transponders is at least partially positioned in a corresponding one of the plurality of pockets.

15. The position detection system of example 14, wherein at least a portion of each of the plurality of passive RFID transponders is removably inserted into a corresponding pocket.

16. The position detection system of any one of examples 11-15, wherein the plurality of passive RFID transponders are arranged in a hexagonal pattern.

17. The position detection system of any one of examples 11-16, wherein the centers of each of the plurality of passive RFID transponders is spaced 18 mm from the center of each adjacent passive RFID transponder.

18. The position detection system of any one of examples 11-17, wherein the medical device simulator is one of a stethoscope, an ultrasound wand, an electrocardiogram (ECG) probe, and a defibrillation pad.

19. The position detection system of any one of examples 11-17, wherein the medical device simulator is a stethoscope comprising: a head including a stainless steel body, a spacer coupled to the stainless steel body, a ferrite disc, a faceplate, and an RFID antenna communicatively coupled to the RFID reader, wherein the ferrite disc and the RFID antenna are positioned between the spacer and the faceplate.

20. A position detection system, comprising: an RFID matrix membrane configured to be positioned proximate to a human body portion and comprising a plurality of passive RFID transponders, wherein the plurality of passive RFID transponders are arranged in a matrix such that a center of each of the plurality of passive RFID transponders is equidistant from the center of each adjacent passive RFID transponder in a first state; and a medical device simulator comprising a RFID reader and configured to determine a position of the medical device simulator relative to the plurality of passive RFID transponders.

21. The position detection system of example 20, wherein the human body portion is an artificial human body portion.

22. The position detection system of any one of examples 20-21, wherein: the RFID matrix membrane comprises a flexible membrane having a plurality of pockets formed therein; and at least a portion of each of the plurality of passive RFID transponders is removably inserted into one of the plurality of pockets formed in the flexible membrane.

23. The position detection system of any one of examples 20-22, wherein the plurality of passive RFID transponders are arranged in a hexagonal pattern.

24. The position detection system of any one of examples 20-23, wherein the centers of each of the plurality of passive RFID transponders is spaced 18 mm from the center of each adjacent passive RFID transponder.

25. The position detection system of any one of examples 20-24, wherein the medical device simulator is a stethoscope comprising: a stainless steel body, a spacer coupled to the stainless steel body, a ferrite disc, a faceplate, and an RFID antenna communicatively coupled to the RFID reader, wherein the ferrite disc and the RFID antenna are positioned between the spacer and the faceplate.

Aspects of the Disclosure regarding RFID-based Motion Tracking Systems and Methods for providing Medical Device Feedback during Simulation The following aspects are provided as examples in accordance with the disclosure herein and are not intended to limit the scope of the disclosure.

1. A radio frequency identification (RFID)-based motion tracking system configured to provide medical device feedback during simulation, the RFID-based motion tracking system comprising: a plurality of passive RFID transponders forming part of an RFID matrix membrane and configured to be positioned proximate to at least one human body portion, wherein each of the RFID transponders has an X-position and a Y-position relative to the RFID matrix membrane; a medical device simulator comprising an RFID reader configured detect respective RFID signals and X-Y coordinates from each of the plurality of passive RFID transponders; an application (app) comprising computing instructions for analyzing one or more RFID signals detected by the RFID reader from the plurality of passive RFID transponders, the app configured for installation and storage on a computer memory of a computing device, wherein the computing instructions of the app, when executed by one or more processors of the computing device, cause the one or more processors to: receive RFID signal data and X-Y coordinate data as detected by the RFID reader from at least a portion of the plurality of passive RFID transponders, and analyze the RFID signal data and the X-Y coordinate data to determine a position of the medical device simulator relative to the at least one human body portion.

2. The RFID motion tracking system of example 1, wherein determining the position of the medical device simulator relative to the at least one human body portion comprises: determining, from the RFID signal data and the X-Y coordinate data, a first X-position, a first Y-position, and a first signal strength of a first RFID transponder of the plurality of passive RFID transponders, wherein the first signal strength corresponds to a first proximity of the medical device simulator to the first RFID transponder, determining, from the RFID signal data and the X-Y coordinate data, a second X-position, a second Y-position, and a second signal strength of a second RFID transponder of the plurality of passive RFID transponders, wherein the second signal strength corresponds to a second proximity of the medical device simulator to the second RFID transponder, wherein analyzing the RFID signal data and the X-Y coordinate data to determine the position comprises generating a weighted RFID signal centroid position based on a weighting of the first signal strength compared to the second signal strength, wherein (1) the weighted RFID signal centroid position is nearer to the first RFID transponder when the first signal strength is greater than the second signal strength, (2) the weighted RFID signal centroid position is nearer to the second RFID transponder when the second signal strength is greater than the first signal strength, and (3) the weighted RFID signal centroid position is equidistant from the first RFID transponder and the second RFID transponder when the first signal strength is equal to the second signal strength.

3. The RFID motion tracking system of any one of examples 1-2, wherein determining the position of the medical device simulator relative to the at least one human body portion further comprises: determining, from the RFID signal data and the X-Y coordinate data, a first X-position, a first Y-position, and a first signal strength of a first RFID transponder of the plurality of passive RFID transponders, wherein the first signal strength corresponds to a first proximity of the medical device simulator to the first RFID transponder, determining, from the RFID signal data and the X-Y coordinate data, a second X-position, a second Y-position, and a second signal strength of a second RFID transponder of the plurality of passive RFID transponders, wherein the second signal strength corresponds to a second proximity of the medical device simulator to the second RFID transponder, determining, from the RFID signal data and the X-Y coordinate data, a third X-position, a third Y-position, and a third signal strength of a third RFID transponder of the plurality of passive RFID transponders, wherein the third signal strength corresponds to a third proximity of the medical device simulator to the third RFID transponder, wherein analyzing the RFID signal data and the X-Y coordinate data to determine the position comprises generating a weighted RFID signal centroid position based on a weighting of each of the first signal, the second signal strength and the third signal strength, wherein the weighted centroid position is adjusted toward each of the first RFID transponder, the second RFID transponder, and/or the third RFID transponder proportionally based on a weighted magnitude of each of the first signal strength, second signal strength, and/or third signal strength, respectively.

4. The RFID motion tracking system of any one of examples 2-3, wherein the computing instructions of the app, when executed by one or more processors of the computing device, further cause the one or more processors to: output a feedback indication corresponding to the position of the medical device simulator compared to a reference position for the at least one human body portion.

5. The RFID motion tracking system of example 4, wherein the feedback indication is at least one of: an audible indication output by a speaker or a visual indication output to a display screen.

6. The RFID motion tracking system of example 5, wherein at least one of: (a) the visual indication comprises one or more graphics depicting a graphical area of the body representative of the human body portion and a location marker indicating the position of the medical device simulator relative to the graphical area of the body; (b) the visual indication comprises a graphic or text indicating a positioning score having a value corresponding to accurate placement of the medical device simulator relative to the reference position; or (c) the audible indication comprises one or more sounds output based on the position of the medical device simulator relative to one or more groups of passive RFID transponders selected from the plurality of passive RFID transponders.

7. The RFID motion tracking system of any one of examples 2-6, wherein the medical device simulator comprises a device processor communicatively coupled to the RFID reader, and wherein the device processor is configured to receive the RFID signal data from at least a portion of the plurality of passive RFID transponders, and wherein the device processor is configured to transmit the RFID signal data to a processor of the computing device for input into the app.

8. The RFID motion tracking system of any one of examples 2-7, wherein the computing instructions of the app, when executed by the one or more processors of the computing device, further causes the one or more processors to: define an X-Y coordinate plane corresponding to a surface of the RFID matrix membrane, the X-Y coordinate plane mapped relative to the RFID matrix membrane based on respective X-Y coordinates of the plurality of passive RFID transponders, generate one or more zones defined within the X-Y coordinate plane, wherein each zone of the one or more zones comprises an area of the RFID matrix membrane defined by a passive RFID transponder subset, the RFID transponder subset comprising one or more passive RFID transponders selected from the plurality of passive RFID transponders, and wherein each zone defines a zone type and a variable having a magnitude that adapts based on a relative proximity of the position of the medical device simulator within the zone, determine a current X-Y coordinate within the X-Y coordinate plane as the position of the medical device simulator; and identify a current zone of the one or more zones, the current zone having the current X-Y coordinate, wherein the medical device simulator is positioned within the current zone.

9. The RFID motion tracking system of example 8, wherein the current X-Y coordinate is positioned within at least two of the one or more zones that overlap within the X-Y coordinate plane, and wherein the current zone is selected as the zone having the variable with a greatest magnitude.

10. The RFID motion tracking system of example 8, wherein the variable defines sound volume of human organ or a medical condition, and wherein the magnitude of the sound volume adapts based on the relative proximity of the position of the medical device simulator within the current zone.

11. The RFID motion tracking system of example 10, wherein the current X-Y coordinate is positioned within the current zone and a second zone of the one or more zones, wherein the current zone and the second zone overlap within the X-Y coordinate plane, and wherein a second magnitude of a second sound volume adapts based on a second relative proximity of the position of the medical device simulator within the second zone.

12. The RFID motion tracking system of example 8, wherein generating the one or more zones of the X-Y coordinate plane comprises: displaying on a display screen a graphical representation of the RFID matrix membrane, wherein the graphical representation of the RFID matrix membrane graphically depicts locations of the plurality of passive RFID transponders; and receiving one or more user selections marking one or more graphical contours overlayed on the graphical representation of the RFID matrix membrane, wherein each of the one or more graphical contours defines the one or more zones.

13. The RFID motion tracking system of example 12, wherein each of the one or more graphical contours is graphically displayed on a display device as corresponding one or more heatmaps, wherein a color intensity of a heatmap of the one or more heatmaps representing the current zone is updated based on the relative proximity of the position of the medical device simulator within the current zone.

14. A radio frequency identification (RFID)-based motion tracking method for providing medical device feedback during simulation, the RFID-based motion tracking method comprising: receiving, at an application (app) installed on a memory of a computing device, RFID signal data and X-Y coordinate data from at least a portion of a plurality of passive RFID transponders, wherein the RFID signal data and the X-Y coordinate data is detected by an RFID reader of a medical device simulator, wherein the plurality of passive RFID transponders form part of an RFID matrix membrane and are configured to be positioned proximate to at least one human body portion, wherein each of the RFID transponders has an X-position and a Y-position relative to the RFID matrix membrane; and analyzing, by the app, the RFID signal data and the X-Y coordinate data to determine a position of the medical device simulator relative to the at least one human body portion.

15. The RFID motion tracking method of example 14, wherein determining the position of the medical device simulator relative to the at least one human body portion comprises: determining, from the RFID signal data and the X-Y coordinate data, a first X-position, a first Y-position, and a first signal strength of a first RFID transponder of the plurality of passive RFID transponders, wherein the first signal strength corresponds to a first proximity of the medical device simulator to the first RFID transponder, determining, from the RFID signal data and the X-Y coordinate data, a second X-position, a second Y-position, and a second signal strength of a second RFID transponder of the plurality of passive RFID transponders, wherein the second signal strength corresponds to a second proximity of the medical device simulator to the second RFID transponder, wherein analyzing the RFID signal data and the X-Y coordinate data to determine the position comprises generating a weighted RFID signal centroid position based on a weighting of the first signal strength compared to the second signal strength, wherein (1) the weighted RFID signal centroid position is nearer to the first RFID transponder when the first signal strength is greater than the second signal strength, (2) the weighted RFID signal centroid position is nearer to the second RFID transponder when the second signal strength is greater than the first signal strength, and (3) the weighted RFID signal centroid position is equidistant from the first RFID transponder and the second RFID transponder when the first signal strength is equal to the second signal strength.

16. The RFID motion tracking method of any one of examples 14-15, wherein determining the position of the medical device simulator relative to the at least one human body portion further comprises: determining, from the RFID signal data and the X-Y coordinate data, a first X-position, a first Y-position, and a first signal strength of a first RFID transponder of the plurality of passive RFID transponders, wherein the first signal strength corresponds to a first proximity of the medical device simulator to the first RFID transponder, determining, from the RFID signal data and the X-Y coordinate data, a second X-position, a second Y-position, and a second signal strength of a second RFID transponder of the plurality of passive RFID transponders, wherein the second signal strength corresponds to a second proximity of the medical device simulator to the second RFID transponder, determining, from the RFID signal data and the X-Y coordinate data, a third X-position, a third Y-position, and a third signal strength of a third RFID transponder of the plurality of passive RFID transponders, wherein the third signal strength corresponds to a third proximity of the medical device simulator to the third RFID transponder, wherein analyzing the RFID signal data and the X-Y coordinate data to determine the position comprises generating a weighted RFID signal centroid position based on a weighting of each of the first signal, the second signal strength and the third signal strength, wherein the weighted centroid position is adjusted toward each of the first RFID transponder, the second RFID transponder, and/or the third RFID transponder proportionally based on a weighted magnitude of each of the first signal strength, second signal strength, and/or third signal strength, respectively.

17. The RFID motion tracking method of any one of examples 14-16 further comprising: outputting a feedback indication corresponding to the position of the medical device simulator compared to a reference position for the at least one human body portion.

18. The RFID motion tracking method of example 17, wherein the feedback indication is at least one of: an audible indication output by a speaker or a visual indication output to a display screen.

19. The RFID motion tracking method of example 18, wherein at least one of: (a) the visual indication comprises one or more graphics depicting a graphical area of the body representative of the human body portion and a location marker indicating the position of the medical device simulator relative to the graphical area of the body; (b) the visual indication comprises a graphic or text indicating a positioning score having a value corresponding to accurate placement of the medical device simulator relative to the reference position; or (c) the audible indication comprises one or more sounds output based on the position of the medical device simulator relative to one or more groups of passive RFID transponders selected from the plurality of passive RFID transponders.

20. The RFID motion tracking method of any one of examples 14-19, wherein the medical device simulator comprises a device processor communicatively coupled to the RFID reader, and wherein the device processor is configured to receive the RFID signal data from at least a portion of the plurality of passive RFID transponders, and wherein the device processor is configured to transmit the RFID signal data to a processor of the computing device for input into the app.

21. The RFID motion tracking method of any one of examples 14-20 further comprising: defining an X-Y coordinate plane corresponding to a surface of the RFID matrix membrane, the X-Y coordinate plane mapped relative to the RFID matrix membrane based on respective X-Y coordinates of the plurality of passive RFID transponders, generating one or more zones defined within the X-Y coordinate plane, wherein each zone of the one or more zones comprises an area of the RFID matrix membrane defined by a passive RFID transponder subset, the RFID transponder subset comprising one or more passive RFID transponders selected from the plurality of passive RFID transponders, and wherein each zone defines a zone type and a variable having a magnitude that adapts based on a relative proximity of the position of the medical device simulator within the zone, determining a current X-Y coordinate within the X-Y coordinate plane as the position of the medical device simulator; and identifying a current zone of the one or more zones, the current zone having the current X-Y coordinate, wherein the medical device simulator is positioned within the current zone.

22. The RFID motion tracking method of example 21, wherein the current X-Y coordinate is positioned within at least two of the one or more zones that overlap within the X-Y coordinate plane, and wherein the current zone is selected as the zone having the variable with a greatest magnitude.

23. The RFID motion tracking method of example 22, wherein the variable defines sound volume of human organ or a medical condition, and wherein the magnitude of the sound volume adapts based on the relative proximity of the position of the medical device simulator within the current zone.

24. The RFID motion tracking method of example 23, wherein the current X-Y coordinate is positioned within the current zone and a second zone of the one or more zones, wherein the current zone and the second zone overlap within the X-Y coordinate plane, and wherein a second magnitude of a second sound volume adapts based on a second relative proximity of the position of the medical device simulator within the second zone.

25. The RFID motion tracking method of example 21, wherein generating the one or more zones of the X-Y coordinate plane comprises: displaying on a display screen a graphical representation of the RFID matrix membrane, wherein the graphical representation of the RFID matrix membrane graphically depicts locations of the plurality of passive RFID transponders; and receiving one or more user selections marking one or more graphical contours overlayed on the graphical representation of the RFID matrix membrane, wherein each of the one or more graphical contours defines the one or more zones.

26. The RFID motion tracking method of example 25, wherein each of the one or more graphical contours is graphically displayed on a display device as corresponding one or more heatmaps, wherein a color intensity of a heatmap of the one or more heatmaps representing the current zone is updated based on the relative proximity of the position of the medical device simulator within the current zone.

27. A tangible, non-transitory computer-readable medium storing instructions for providing medical device feedback during simulation, that when executed by one or more processors cause the one or more processors to: receive, at an application (app) installed on a memory of a computing device, RFID signal data and X-Y coordinate data from at least a portion of a plurality of passive RFID transponders, wherein the RFID signal data and the X-Y coordinate data is detected by an RFID reader of a medical device simulator, wherein the plurality of passive RFID transponders form part of an RFID matrix membrane and are configured to be positioned proximate to at least one human body portion, wherein each of the RFID transponders has an X-position and a Y-position relative to the RFID matrix membrane; and analyze, by the app, the RFID signal data and the X-Y coordinate data to determine a position of the medical device simulator relative to the at least one human body portion.

ADDITIONAL DISCLOSURE

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A radio frequency identification (RFID)-based motion tracking system configured to provide medical device feedback during simulation, the RFID-based motion tracking system comprising:

a plurality of passive RFID transponders forming part of an RFID matrix membrane and configured to be positioned proximate to at least one human body portion, wherein each of the RFID transponders has an X-position and a Y-position relative to the RFID matrix membrane;

a medical device simulator comprising an RFID reader configured detect respective RFID signals and X-Y coordinates from each of the plurality of passive RFID transponders;

an application (app) comprising computing instructions for analyzing one or more RFID signals detected by the RFID reader from the plurality of passive RFID transponders, the app configured for installation and storage on a computer memory of a computing device, wherein the computing instructions of the app, when executed by one or more processors of the computing device, cause the one or more processors to:

receive RFID signal data and X-Y coordinate data as detected by the RFID reader from at least a portion of the plurality of passive RFID transponders, and analyze the RFID signal data and the X-Y coordinate data to determine a position of the medical device simulator relative to the at least one human body portion, define an X-Y coordinate plane corresponding to a surface of the RFID matrix membrane, the X-Y coordinate plane mapped relative to the RFID matrix membrane based on respective X-Y coordinates of the plurality of passive RFID transponders, generate one or more zones defined within the X-Y coordinate plane, wherein each zone of the one or more zones comprises an area of the RFID matrix membrane defined by a passive RFID transponder subset, the RFID transponder subset comprising one or more passive RFID transponders selected from the plurality of passive RFID transponders, and wherein each zone defines a zone type and a variable having a magnitude that adapts based on a relative proximity of the position of the medical device simulator within the zone, determine a current X-Y coordinate within the X-Y coordinate plane as the position of the medical device simulator, and identify a current zone of the one or more zones, the current zone having the current X-Y coordinate, wherein the medical device simulator is positioned within the current zone, wherein generating the one or more zones of the X-Y coordinate plane comprises:

displaying on a display screen a graphical representation of the RFID matrix membrane, wherein the graphical representation of the RFID matrix membrane graphically depicts locations of the plurality of passive RFID transponders, and receiving one or more user selections marking one or more graphical contours overlayed on the graphical representation of the RFID matrix membrane, wherein each of the one or more graphical contours defines the one or more zones, and wherein each of the one or more graphical contours is graphically displayed on a display device as corresponding one or more heatmaps, wherein a color intensity of a heatmap of the one or more heatmaps representing the current zone is updated based on the relative proximity of the position of the medical device simulator within the current zone.

2. The RFID motion tracking system of claim 1, wherein determining the position of the medical device simulator relative to the at least one human body portion comprises:

determining, from the RFID signal data and the X-Y coordinate data, a first X-position, a first Y-position, and a first signal strength of a first RFID transponder of the plurality of passive RFID transponders, wherein the first signal strength corresponds to a first proximity of the medical device simulator to the first RFID transponder, determining, from the RFID signal data and the X-Y coordinate data, a second X-position, a second Y-position, and a second signal strength of a second RFID transponder of the plurality of passive RFID transponders, wherein the second signal strength corresponds to a second proximity of the medical device simulator to the second RFID transponder, wherein analyzing the RFID signal data and the X-Y coordinate data to determine the position comprises generating a weighted RFID signal centroid position based on a weighting of the first signal strength compared to the second signal strength, wherein (1) the weighted RFID signal centroid position is nearer to the first RFID transponder when the first signal strength is greater than the second signal strength, (2) the weighted RFID signal centroid position is nearer to the second RFID transponder when the second signal strength is greater than the first signal strength, and (3) the weighted RFID signal centroid position is equidistant from the first RFID transponder and the second RFID transponder when the first signal strength is equal to the second signal strength.

3. The RFID motion tracking system of claim 1, wherein determining the position of the medical device simulator relative to the at least one human body portion further comprises:

determining, from the RFID signal data and the X-Y coordinate data, a first X-position, a first Y- position, and a first signal strength of a first RFID transponder of the plurality of passive RFID transponders, wherein the first signal strength corresponds to a first proximity of the medical device simulator to the first RFID transponder, determining, from the RFID signal data and the X-Y coordinate data, a second X-position, a second Y-position, and a second signal strength of a second RFID transponder of the plurality of passive RFID transponders, wherein the second signal strength corresponds to a second proximity of the medical device simulator to the second RFID transponder, determining, from the RFID signal data and the X-Y coordinate data, a third X-position, a third Y-position, and a third signal strength of a third RFID transponder of the plurality of passive RFID transponders, wherein the third signal strength corresponds to a third proximity of the medical device simulator to the third RFID transponder, wherein analyzing the RFID signal data and the X-Y coordinate data to determine the position comprises generating a weighted RFID signal centroid position based on a weighting of each of the first signal, the second signal strength and the third signal strength, wherein the weighted centroid position is adjusted toward each of the first RFID transponder, the second RFID transponder, and/or the third RFID transponder proportionally based on a weighted magnitude of each of the first signal strength, second signal strength, and/or third signal strength, respectively.

4. The RFID motion tracking system of claim 1, wherein the computing instructions of the app, when executed by one or more processors of the computing device, further cause the one or more processors to:

output a feedback indication corresponding to the position of the medical device simulator compared to a reference position for the at least one human body portion.

5. The RFID motion tracking system of claim 4, wherein the feedback indication is at least one of: an audible indication output by a speaker or a visual indication output to a display screen.

6. The RFID motion tracking system of claim 5, wherein at least one of:

(a) the visual indication comprises one or more graphics depicting a graphical area of the body representative of the human body portion and a location marker indicating the position of the medical device simulator relative to the graphical area of the body;

(b) the visual indication comprises a graphic or text indicating a positioning score having a value corresponding to accurate placement of the medical device simulator relative to the reference position; or (c) the audible indication comprises one or more sounds output based on the position of the medical device simulator relative to one or more groups of passive RFID transponders selected from the plurality of passive RFID transponders.

7. The RFID motion tracking system of claim 1, wherein the medical device simulator comprises a device processor communicatively coupled to the RFID reader, and wherein the device processor is configured to receive the RFID signal data from at least a portion of the plurality of passive RFID transponders, and wherein the device processor is configured to transmit the RFID signal data to a processor of the computing device for input into the app.

8. The RFID motion tracking system of claim 1, wherein the current X-Y coordinate is positioned within at least two of the one or more zones that overlap within the X-Y coordinate plane, and wherein the current zone is selected as the zone having the variable with a greatest magnitude.

9. The RFID motion tracking system of claim 1, wherein the variable defines sound volume of human organ or a medical condition, and wherein the magnitude of the sound volume adapts based on the relative proximity of the position of the medical device simulator within the current zone.

10. The RFID motion tracking system of claim 9, wherein the current X-Y coordinate is positioned within the current zone and a second zone of the one or more zones, wherein the current zone and the second zone overlap within the X-Y coordinate plane, and wherein a second magnitude of a second sound volume adapts based on a second relative proximity of the position of the medical device simulator within the second zone.

11. A radio frequency identification (RFID)-based motion tracking method for providing medical device feedback during simulation, the RFID-based motion tracking method comprising:

receiving, at an application (app) installed on a memory of a computing device, RFID signal data and X-Y coordinate data from at least a portion of a plurality of passive RFID transponders, wherein the RFID signal data and the X-Y coordinate data is detected by an RFID reader of a medical device simulator, wherein the plurality of passive RFID transponders form part of an RFID matrix membrane and are configured to be positioned proximate to at least one human body portion, wherein each of the RFID transponders has an X-position and a Y-position relative to the RFID matrix membrane; and analyzing, by the app, the RFID signal data and the X-Y coordinate data to determine a position of the medical device simulator relative to the at least one human body portion, defining an X-Y coordinate plane corresponding to a surface of the RFID matrix membrane, the X-Y coordinate plane mapped relative to the RFID matrix membrane based on respective X-Y coordinates of the plurality of passive RFID transponders, generating one or more zones defined within the X-Y coordinate plane, wherein each zone of the one or more zones comprises an area of the RFID matrix membrane defined by a passive RFID transponder subset, the RFID transponder subset comprising one or more passive RFID transponders selected from the plurality of passive RFID transponders, and wherein each zone defines a zone type and a variable having a magnitude that adapts based on a relative proximity of the position of the medical device simulator within the zone, determining a current X-Y coordinate within the X-Y coordinate plane as the position of the medical device simulator; and identifying a current zone of the one or more zones, the current zone having the current X-Y coordinate, wherein the medical device simulator is positioned within the current zone, wherein generating the one or more zones of the X-Y coordinate plane comprises:

displaying on a display screen a graphical representation of the RFID matrix membrane, wherein the graphical representation of the RFID matrix membrane graphically depicts locations of the plurality of passive RFID transponders; and receiving one or more user selections marking one or more graphical contours overlayed on the graphical representation of the RFID matrix membrane, wherein each of the one or more graphical contours defines the one or more zones, wherein each of the one or more graphical contours is graphically displayed on a display device as corresponding one or more heatmaps, wherein a color intensity of a heatmap of the one or more heatmaps representing the current zone is updated based on the relative proximity of the position of the medical device simulator within the current zone.

12. The RFID motion tracking method of claim 11, wherein determining the position of the medical device simulator relative to the at least one human body portion comprises:

determining, from the RFID signal data and the X-Y coordinate data, a first X-position, a first Y-position, and a first signal strength of a first RFID transponder of the plurality of passive RFID transponders, wherein the first signal strength corresponds to a first proximity of the medical device simulator to the first RFID transponder, determining, from the RFID signal data and the X-Y coordinate data, a second X-position, a second Y-position, and a second signal strength of a second RFID transponder of the plurality of passive RFID transponders, wherein the second signal strength corresponds to a second proximity of the medical device simulator to the second RFID transponder, wherein analyzing the RFID signal data and the X-Y coordinate data to determine the position comprises generating a weighted RFID signal centroid position based on a weighting of the first signal strength compared to the second signal strength, wherein (1) the weighted RFID signal centroid position is nearer to the first RFID transponder when the first signal strength is greater than the second signal strength, (2) the weighted RFID signal centroid position is nearer to the second RFID transponder when the second signal strength is greater than the first signal strength, and (3) the weighted RFID signal centroid position is equidistant from the first RFID transponder and the second RFID transponder when the first signal strength is equal to the second signal strength.

13. The RFID motion tracking method of claim 11, wherein determining the position of the medical device simulator relative to the at least one human body portion further comprises:

determining, from the RFID signal data and the X-Y coordinate data, a first X-position, a first Y-position, and a first signal strength of a first RFID transponder of the plurality of passive RFID transponders, wherein the first signal strength corresponds to a first proximity of the medical device simulator to the first RFID transponder, determining, from the RFID signal data and the X-Y coordinate data, a second X-position, a second Y-position, and a second signal strength of a second RFID transponder of the plurality of passive RFID transponders, wherein the second signal strength corresponds to a second proximity of the medical device simulator to the second RFID transponder, determining, from the RFID signal data and the X-Y coordinate data, a third X-position, a third Y-position, and a third signal strength of a third RFID transponder of the plurality of passive RFID transponders, wherein the third signal strength corresponds to a third proximity of the medical device simulator to the third RFID transponder, wherein analyzing the RFID signal data and the X-Y coordinate data to determine the position comprises generating a weighted RFID signal centroid position based on a weighting of each of the first signal, the second signal strength and the third signal strength, wherein the weighted centroid position is adjusted toward each of the first RFID transponder, the second RFID transponder, and/or the third RFID transponder proportionally based on a weighted magnitude of each of the first signal strength, second signal strength, and/or third signal strength, respectively.

14. The RFID motion tracking method of claim 11 further comprising:

outputting a feedback indication corresponding to the position of the medical device simulator compared to a reference position for the at least one human body portion.

15. The RFID motion tracking method of claim 14, wherein the feedback indication is at least one of: an audible indication output by a speaker or a visual indication output to a display screen.

16. The RFID motion tracking method of claim 15, wherein at least one of:

(a) the visual indication comprises one or more graphics depicting a graphical area of the body representative of the human body portion and a location marker indicating the position of the medical device simulator relative to the graphical area of the body;

(b) the visual indication comprises a graphic or text indicating a positioning score having a value corresponding to accurate placement of the medical device simulator relative to the reference position; or (c) the audible indication comprises one or more sounds output based on the position of the medical device simulator relative to one or more groups of passive RFID transponders selected from the plurality of passive RFID transponders.

17. The RFID motion tracking method of claim 11, wherein the medical device simulator comprises a device processor communicatively coupled to the RFID reader, and wherein the device processor is configured to receive the RFID signal data from at least a portion of the plurality of passive RFID transponders, and wherein the device processor is configured to transmit the RFID signal data to a processor of the computing device for input into the app.

18. The RFID motion tracking method of claim 11, wherein the current X-Y coordinate is positioned within at least two of the one or more zones that overlap within the X-Y coordinate plane, and wherein the current zone is selected as the zone having the variable with a greatest magnitude.

19. The RFID motion tracking method of claim 18, wherein the variable defines sound volume of human organ or a medical condition, and wherein the magnitude of the sound volume adapts based on the relative proximity of the position of the medical device simulator within the current zone.

20. The RFID motion tracking method of claim 19, wherein the current X-Y coordinate is positioned within the current zone and a second zone of the one or more zones, wherein the current zone and the second zone overlap within the X-Y coordinate plane, and wherein a second magnitude of a second sound volume adapts based on a second relative proximity of the position of the medical device simulator within the second zone.

21. A tangible, non-transitory computer-readable medium storing instructions for providing medical device feedback during simulation, that when executed by one or more processors cause the one or more processors to:

receive, at an application (app) installed on a memory of a computing device, RFID signal data and X-Y coordinate data from at least a portion of a plurality of passive RFID transponders, wherein the RFID signal data and the X-Y coordinate data is detected by an RFID reader of a medical device simulator, wherein the plurality of passive RFID transponders form part of an RFID matrix membrane and are configured to be positioned proximate to at least one human body portion, wherein each of the RFID transponders has an X-position and a Y-position relative to the RFID matrix membrane; and analyze, by the app, the RFID signal data and the X-Y coordinate data to determine a position of the medical device simulator relative to the at least one human body portion, define an X-Y coordinate plane corresponding to a surface of the RFID matrix membrane, the X-Y coordinate plane mapped relative to the RFID matrix membrane based on respective X-Y coordinates of the plurality of passive RFID transponders, generate one or more zones defined within the X-Y coordinate plane, wherein each zone of the one or more zones comprises an area of the RFID matrix membrane defined by a passive RFID transponder subset, the RFID transponder subset comprising one or more passive RFID transponders selected from the plurality of passive RFID transponders, and wherein each zone defines a zone type and a variable having a magnitude that adapts based on a relative proximity of the position of the medical device simulator within the zone, determine a current X-Y coordinate within the X-Y coordinate plane as the position of the medical device simulator; and identify a current zone of the one or more zones, the current zone having the current X-Y coordinate, wherein the medical device simulator is positioned within the current zone, wherein generating the one or more zones of the X-Y coordinate plane comprises:

displaying on a display screen a graphical representation of the RFID matrix membrane. wherein the graphical representation of the RFID matrix membrane graphically depicts locations of the plurality of passive RFID transponders; and receiving one or more user selections marking one or more graphical contours overlayed on the graphical representation of the RFID matrix membrane, wherein each of the one or more graphical contours defines the one or more zones, wherein each of the one or more graphical contours is graphically displayed on a display device as corresponding one or more heatmaps, wherein a color intensity of a heatmap of the one or more heatmaps representing the current zone is updated based on the relative proximity of the position of the medical device simulator within the current zone.

* * * * *